US012699349B2

(12) United States Patent
Kamiya

(10) Patent No.: US 12,699,349 B2
(45) Date of Patent: Aug. 4, 2026

(54) IMAGE FORMING APPARATUS HAVING CIRCUIT BOARD INSTALLATION IN BOTTOM SURFACE

(71) Applicant: BROTHER KOGYO KABUSHIKI KAISHA, Nagoya (JP)

(72) Inventor: Masataka Kamiya, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/027,754

(22) Filed: Jan. 17, 2025

(65) Prior Publication Data

US 2025/0244705 A1 Jul. 31, 2025

(30) Foreign Application Priority Data

Jan. 31, 2024 (JP) ................................ 2024-012765

(51) Int. Cl.

*G03G 21/00* (2006.01)
*G03G 15/00* (2006.01)
*G03G 21/16* (2006.01)

(52) U.S. Cl.

CPC ......... *G03G 15/80* (2013.01); *G03G 21/1652* (2013.01); *G03G 2221/166* (2013.01)

(58) Field of Classification Search

CPC ............... G03G 15/80; G03G 21/1619; G03G 21/1633; G03G 21/1652; G03G 21/206; G03G 2221/166; G03G 2221/1645

USPC ..................................................... 399/90, 92

See application file for complete search history.

(56) References Cited

U.S. PATENT DOCUMENTS

| | | | | |
|---|---|---|---|---|
| 5,659,459 A * | 8/1997 | Wakabayashi | B41J 29/377 | 361/753 |
| 11,706,361 B2 * | 7/2023 | Wada | H04N 1/00204 | 358/1.15 |
| 2006/0046543 A1 * | 3/2006 | Fujii | B41J 29/02 | 439/159 |
| 2007/0090187 A1 * | 4/2007 | Arimoto | H05K 5/0286 | 235/441 |
| 2007/0226619 A1 * | 9/2007 | Ikeno | H04N 1/00408 | 715/700 |

(Continued)

FOREIGN PATENT DOCUMENTS

| | | |
|---|---|---|
| JP | 61-129656 A * | 6/1986 |
| JP | 11-143161 A | 5/1999 |

(Continued)

*Primary Examiner* — Robert B Beatty
(74) *Attorney, Agent, or Firm* — Merchant & Gould P.C.

(57) ABSTRACT

An image forming apparatus includes an image forming unit, a main housing, a sheet tray, and a first circuit board removably installed in the main housing. The main housing accommodates the image forming unit and has a bottom surface, a first side surface on one side, and a second side surface on another side. A first side cover forms the first side surface, and a second side cover of the image forming unit forms the second side surface. The sheet tray is positioned between the first side cover and the second side cover in a first direction. The main housing includes an opening in the bottom surface between the first side cover and the sheet tray in the first direction. The opening allows communication between outside and inside of the main housing and allows the first circuit board to pass therethrough when it is being installed into the main housing.

19 Claims, 13 Drawing Sheets

(56) References Cited

U.S. PATENT DOCUMENTS

| | | | | |
|---|---|---|---|---|
| 2008/0174973 | A1* | 7/2008 | Tanaka | H05K 1/0218 361/736 |
| 2008/0180747 | A1* | 7/2008 | Tsuzuki | H04N 1/2158 358/1.15 |
| 2009/0146362 | A1* | 6/2009 | Yoshioka | H04N 1/00567 271/3.14 |
| 2015/0063863 | A1* | 3/2015 | Koyanagi | G03G 15/80 399/107 |
| 2015/0146251 | A1* | 5/2015 | Ueyama | H04N 1/00557 358/1.15 |
| 2020/0192270 | A1* | 6/2020 | Kase | G03G 21/1853 |
| 2022/0182501 | A1* | 6/2022 | Jo | H04N 1/00564 |
| 2024/0389218 | A1* | 11/2024 | Kawasaki | G03G 21/1652 |

FOREIGN PATENT DOCUMENTS

| | | | | | |
|---|---|---|---|---|---|
| KR | 19990055077 | A | * | 7/1999 | G03G 15/5004 |
| KR | 2005058145 | A | * | 6/2005 | |

* cited by examiner

IMAGE FORMING APPARATUS HAVING CIRCUIT BOARD INSTALLATION IN BOTTOM SURFACE

REFERENCE TO RELATED APPLICATIONS

This application claims priority from Japanese Patent Application No. 2024-012765 filed on Jan. 31, 2024. The entire contents of the priority application are incorporated herein by reference.

BACKGROUND ART

An image forming apparatus including a main housing and a circuit board installed in the main housing is known in the art. In such an image forming apparatus, the image forming apparatus further includes a controller housing configured to support the circuit board at a lower portion inside the main housing. The circuit board is replaceable by removing the controller housing from the bottom of the main housing.

SUMMARY

In such an image forming apparatus known in the art, a bottom surface of the main housing needs to be widely opened to replace the circuit board; thus, the circuit board is not easily replaceable from the bottom surface of the main housing.

It would be desirable to be able to easily replace the circuit board from the bottom surface of the main housing.

In one aspect, an image forming apparatus disclosed herein comprises an image forming unit, a main housing, a sheet tray, and a first circuit board.

The image forming unit forms an image on a sheet.

The main housing accommodates the image forming unit. The main housing has a bottom surface, a first side surface on one side of the image forming unit, and a second side surface on another side of the image forming unit. The main housing comprises a first side cover forming the first side surface and a second side cover forming the second side surface.

The second side cover is opposed to the first side cover in a first direction.

The sheet tray is positioned below the image forming unit. The sheet tray is positioned between the first side cover and the second side cover in the first direction. The sheet tray contains a sheet to be fed to the image forming unit.

The first circuit board is removably installed in the main housing.

The main housing includes an opening in the bottom surface between the first side cover and the sheet tray in the first direction.

The opening allows communication between outside of the main housing and inside of the main housing. The first circuit board is allowed to pass through the opening when the first circuit board is being installed into the main housing.

Since the first circuit board can be replaced through the opening included in the bottom surface of the main housing between the first side cover and the sheet tray in the first direction, the first circuit board can be easily replaced from the bottom surface of the main housing.

The image forming apparatus may comprise a cover and the main housing may include a contact surface on the bottom surface of the main housing. The contact surface contacts a placement surface on which the main housing is placed when in use.

The cover is movable with respect to the main housing between an open position in which the opening is uncovered and a closed position in which the opening is covered.

The cover is positioned above the contact surface when the cover is positioned in the closed position.

Since the image forming apparatus comprises the cover that covers and uncovers the opening, dust can be restrained from entering the main housing through the opening. Since the cover is positioned above the contact surface of the main housing when the cover is positioned in the closed position, it is possible to restrain a force from being exerted on the cover when the main housing is placed on the placement surface.

The cover in the closed position may be positioned between the first side cover and the sheet tray in the first direction and the cover in the open position may be positioned between the first side cover and the sheet tray in the first direction.

Since the cover in the open position is positioned between the first side cover and the sheet tray in the first direction, the cover can be restrained from protruding outward of the first side cover in the first direction even when the cover is in the open position.

The cover may be slidable with respect to the main housing between the open position and the closed position.

Since the cover is slidable with respect to the main housing between the open position and the closed position, the cover can be restrained from protruding downward of the contact surface even when the cover is in the closed position.

The cover may be rotatable with respect to the main housing between the open position and the closed position.

Since the cover is rotatable with respect to the main housing between the open position and the closed position, it is easier to notice that the cover is open.

The image forming apparatus may comprise a holder that holds the first circuit board.

The holder is installable into and removable from the main housing together with the first circuit board.

Since the main housing comprises the holder that holds the first circuit board and is installable into and removable from the main housing together with the first circuit board, the first circuit board can be installed into and removed from the main housing by holding the holder.

The holder may be configured to cover the opening when the holder is installed in the main housing and to uncover the opening when the holder is removed from the main housing.

Since the holder covers and uncovers the opening of the main housing, effort can be saved when replacing the first circuit. Since the holder covers the opening of the main housing, dust can be restrained from entering the main housing through the opening.

The main housing may include a contact surface on the bottom surface of the main housing. The contact surface contacts the placement surface.

The holder is positioned above the contact surface when the holder is installed in the main housing.

Since the holder is positioned above the contact surface when the holder is installed in the main housing, it is possible to restrain a force from being exerted on the holder and the first circuit board when the image forming apparatus is placed on the placement surface.

The image forming apparatus may further comprise a second circuit board. The first circuit board may comprise a first connector and the second circuit board may comprise a second connector.

The second circuit board is installed in the main housing. The second circuit board is electrically connected to the first circuit board in a state where the first circuit board is installed in the main housing.

The second connector is directly connected to the first connector in a state where the first circuit board is installed in the main housing.

Since the first circuit board comprises the first connector and the second circuit board comprises the second connector, the first circuit board and the second circuit board can easily be electrically connected. Accordingly, the first circuit board can be easily replaced.

The first circuit board may comprise a central processing unit (CPU) configured to control the image forming unit.

Since the first circuit board comprises the CPU, the CPU can be replaced when the first circuit board is replaced.

The first circuit board may comprise a DC-DC converter, and the second circuit board may comprise a CPU configured to control the image forming unit.

Since the first circuit board comprises the DC-DC converter, the DC-DC converter can be replaced when the first circuit board is replaced.

The image forming apparatus may comprise a metal plate.

The metal plate is accommodated in the main housing. The metal plate covers the second circuit board.

The metal plate includes an installation guide configured to guide the first circuit board during installation of the first circuit board into the main housing.

Since the metal plate includes the installation guide, the first circuit board can be installed and removed along the installation guide. Accordingly, the first circuit board can be stably installed into and removed from the main housing.

The image forming apparatus may comprise a motor. The main housing may include a first side frame. The opening may be positioned in a bottom surface of the first side frame. The motor provides a driving force to the image forming unit.

The first side frame is positioned between the first side cover and the sheet tray in the first direction. The first side frame supports the motor.

A dimension of the opening in the first direction is smaller than a dimension of the first side frame in the first direction.

Since the dimension of the opening positioned in the bottom surface of the first side frame in the first direction is smaller than the dimension of the first side frame in the first direction, the first circuit board can be restrained from interfering with members around the first side frame when the first circuit board is installed into and removed from the main housing.

The image forming apparatus may comprise a pickup roller and a driving force transmitting mechanism. The first side frame that supports the motor may support the driving force transmitting mechanism.

The pickup roller feeds the sheet contained in the sheet tray to the image forming unit.

The driving force transmitting mechanism transmits the driving force of the motor to the pickup roller.

The motor is positioned between the first circuit board installed in the main housing and the pickup roller as viewed in the first direction.

The driving force transmitting mechanism is positioned between the motor and the pickup roller as viewed in the first direction.

Since the motor is positioned between the first circuit board and the pickup roller as viewed in the first direction, and the driving force transmitting mechanism is positioned between the motor and the pickup roller as viewed in the first direction, the first circuit board can be restrained from interfering with the driving force transmitting mechanism when the first circuit board is installed into and removed from the main housing.

The main housing may comprise a first side frame and a second side frame. The opening may be positioned in a bottom surface of the first side frame.

The first side frame is positioned between the first side cover and the sheet tray in the first direction.

The second side frame is positioned between the second side cover and the sheet tray in the first direction.

The dimension of the first side frame in the first direction is greater than a dimension of the second side frame in the first direction.

Since the dimension of the first side frame having the opening positioned in the bottom surface thereof, in the first direction, is greater than the dimension of the second side frame in the first direction, space for the dimension of the opening in the first direction can be provided. Accordingly, the first circuit board can be easily installed into and removed from the main housing through the opening.

The first side cover may include an air outlet. The second side cover may include an air outlet. The image forming apparatus may comprise a fan.

The fan generates an air flow flowing from the air inlet toward the air outlet inside the main housing. The fan is positioned closer to the second side frame than to the first side frame inside the main housing.

The air inlet is positioned on one side of a vertical line running through a central portion of the first side cover in the horizontal direction as viewed in the first direction.

The first circuit board is positioned on another side of the vertical line as viewed in the first direction when the first circuit board is installed in the main housing.

Since the air inlet is positioned on one side of the vertical line running through the central portion of the first side cover in the horizontal direction, and the first circuit board is positioned on the other side of the vertical line, the air inlet and the first circuit board can be positioned apart from each other.

The image forming apparatus may comprise a display facing upward.

The display is positioned below a top surface of the main housing.

Since the display is positioned below the top surface of the main housing, the top surface contacts the placement surface for the image forming apparatus even if the image forming apparatus is placed upside down on the placement surface upon replacing the first circuit board. Accordingly, it is possible to restrain a force from being exerted on the display. The image forming apparatus may comprise a display facing upward and an elastic member.

The elastic member protrudes upward to a height higher than a height of the display and a height of the top surface of the main housing.

Since the elastic member protrudes upward to the height higher than the height of the display and the height of the top surface of the main housing, the elastic member contacts the placement surface even if the image forming apparatus is placed upside down on the placement surface to replace the first circuit board. Accordingly, it is possible to restrain a force from being exerted on the display. Since the elastic member contacts the placement surface when the image forming apparatus is placed upside down on the placement surface, the impact on the image forming apparatus when the image forming apparatus is placed upside down can be softened.

The elastic member may be a button for operating the image forming apparatus.

Since the elastic member is a button for operating the image forming apparatus, the number of components can be reduced.

DESCRIPTION

Figure 1:
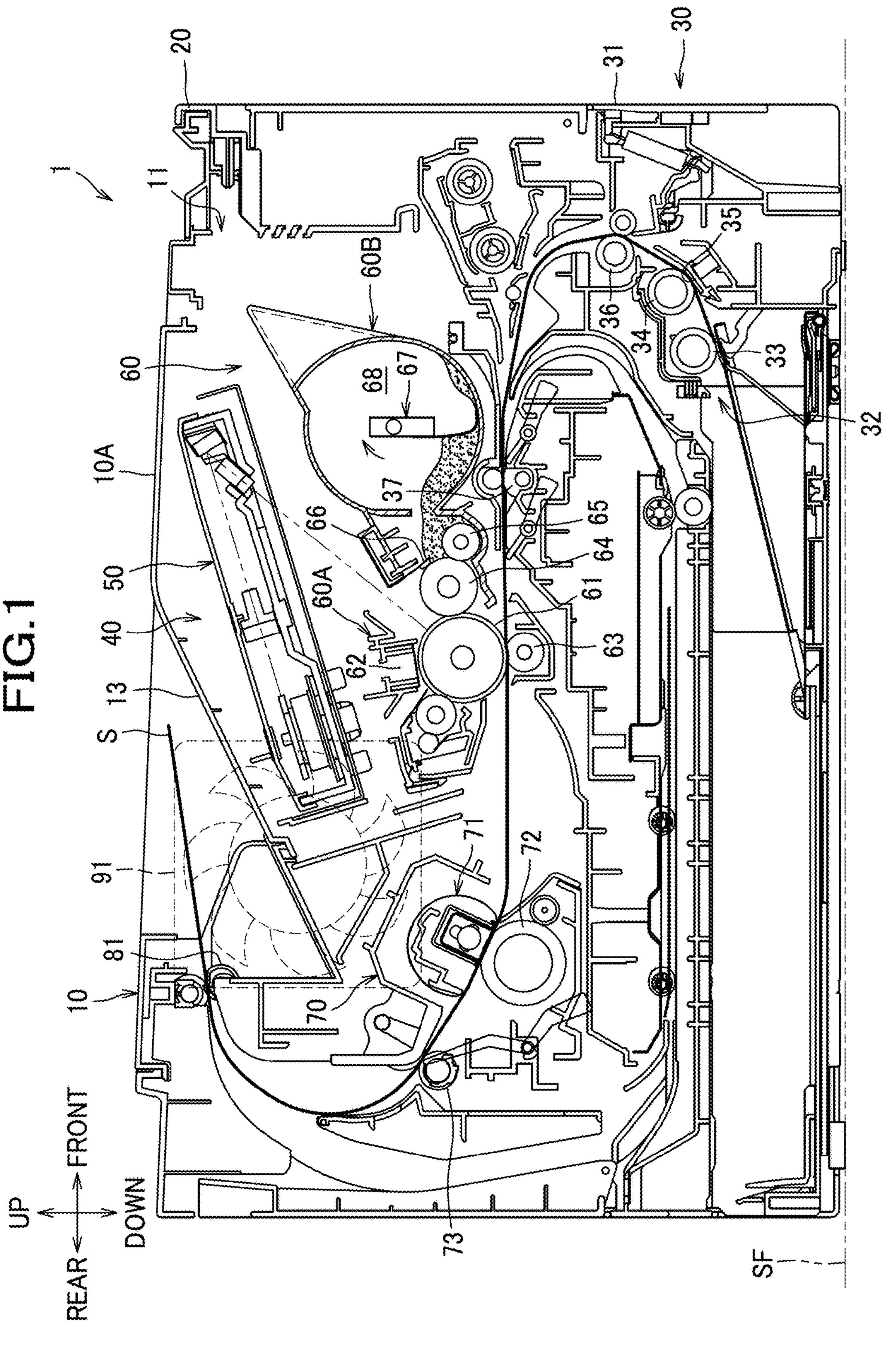
FIG. 1 is a cross-sectional view of an image forming apparatus according to a first embodiment.

A first embodiment of the present disclosure will be described in detail referring to the drawings where appropriate.

As shown in FIG. 1, an image forming apparatus 1 comprises a main housing 10, a front cover 20, a sheet feeder unit 30, an image forming unit 40, and an ejection roller 81.

The main housing 10 is a housing in which the sheet feeder unit 30, the image forming unit 40, and other components, are accommodated.

The front cover 20 covers and uncovers a front opening 11 of the main housing 10. The main housing 10 includes the front opening 11 on a front surface thereof.

The sheet feeder unit 30 feeds sheets S to the image forming unit 40. The sheet feeder unit 30 comprises a sheet tray 31 and a sheet feeding mechanism 32. The sheet tray 31 contains sheets S that are fed to the image forming unit 40. The sheet tray 31 is installable into and removable from the main housing 10. The sheet tray 31 installed in the main housing 10 is positioned below the image forming unit 40.

The sheet feeding mechanism 32 comprises a pickup roller 33, a separation roller 34, a separation pad 35, a conveyor roller 36, and a registration roller 37. The pickup roller 33 feeds sheets S contained in the sheet tray 31 toward the image forming unit 40. The separation roller 34 and the separation pad 35 separate one sheet S from other sheets S fed by the pickup roller 33. The conveyor roller 36 and the registration roller 37 convey sheets S to the image forming unit 40.

The image forming unit 40 forms an image on sheets S. The image forming unit 40 comprises an exposure unit 50, a process unit 60 as a replaceable unit, and a fixing unit 70.

The exposure unit 50 is positioned at an upper portion of the main housing 10. The exposure unit 50 comprises a light source, a deflector, lenses, mirrors, and other components. The exposure unit 50 emits a light beam as shown by an imaginary line and exposes a surface of a photosensitive drum 61 of the image forming unit 40.

The process unit 60 is positioned inside the main housing 10 between the exposure unit 50 and the sheet tray 31. The process unit 60 comprises a drum unit 60A and a development unit 60B installable and removable from the drum unit 60A.

The process unit 60 is installable into and removable from the main housing 10 through the front opening 11 when the front cover 20 uncovers the front opening 11. The drum unit 60A comprises a photosensitive drum 61, a charger 62, and a transfer roller 63. A toner image is formed on a surface of the photosensitive drum 61.

The development unit 60B comprises a development roller 64, a supply roller 65, a doctor blade 66, an agitator 67, and a toner container 68. The toner container 68 contains toner. The agitator 67 agitates toner in the toner container 68. The agitator 67 also supplies toner to the supply roller 65. The supply roller 65 supplies toner to the development roller 64. The doctor blade 66 contacts a surface of the development roller 64 and adjusts thickness of toner on the development roller 64 to a uniform thickness.

The fixing unit 70 is positioned inside the main housing 10 at a position rearward of the process unit 60. The fixing unit 70 comprises a heating unit 71, a pressure roller 72, and an intermediate ejection roller 73. The heating unit 71 comprises a heater, a fixing belt, a nip plate, etc. The heating unit heats the sheet S. The pressure roller 72 is pressed against the heating unit 71.

In the image forming unit 40, the charger 62 charges the surface of the photosensitive drum 61. The exposure unit 50 emits light beam on the surface of the charged photosensitive drum 61. Accordingly, an electrostatic latent image based on image data is formed on the photosensitive drum 61. The development roller 64 supplies toner to the surface of the exposed photosensitive drum 61. A toner image is thereby formed on the photosensitive drum 61.

The photosensitive drum 61 and the transfer roller 63 convey the sheet S fed from the sheet feeder unit 30. Accordingly, the toner image formed on the photosensitive drum 61 is transferred onto the sheet S. The heating unit 71 and the pressure roller 72 convey the sheet S with the toner image transferred thereon. Accordingly, the toner image transferred onto the sheet S is fixed onto the sheet S. The intermediate ejection roller 73 conveys the sheet S with the toner image fixed thereon toward the ejection roller 81.

The ejection roller 81 is positioned above the fixing unit 70. The ejection roller 81 ejects the sheet S with the toner image formed thereon in the image forming unit 40 onto an output tray 13. The output tray 13 is formed on a top surface 10A of the main housing 10.

Figure 2:
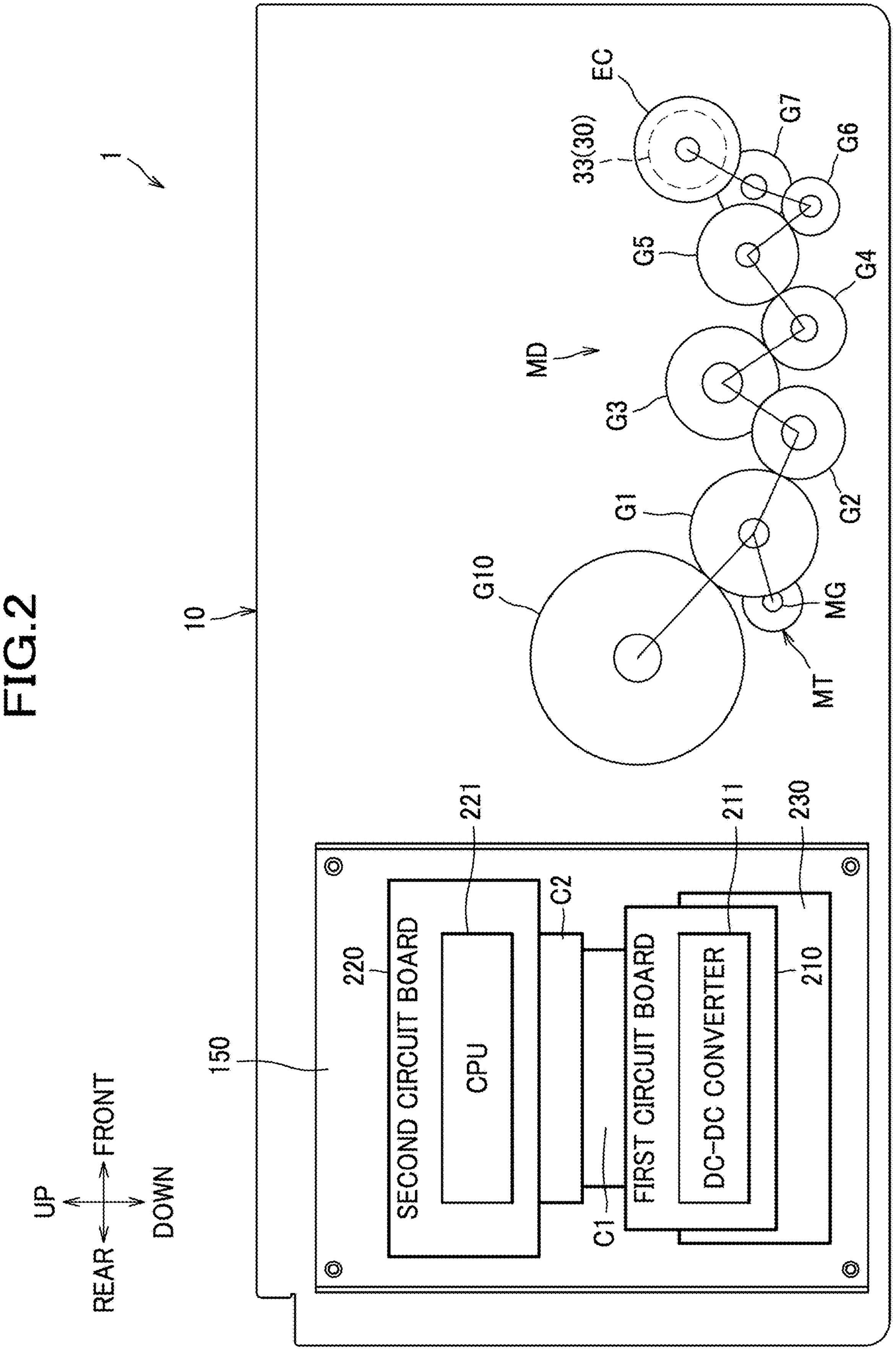
FIG. 2 is an illustration showing a motor, a driving force transmitting mechanism, a first circuit board, and a second circuit board.

As shown in FIG. 2, the image forming apparatus 1 further comprises a motor MT, a driving force transmitting mechanism MD, a first circuit board 210, a second circuit board 220, a holder 230, and a metal plate 150.

The motor MT is a driving source that provides a driving force to the sheet feeder unit 30, the image forming unit 40 (refer to FIG. 1), and other components.

The driving force transmitting mechanism MD transmits the driving force of the motor MT to the pickup roller 33. The driving force transmitting mechanism MD is positioned between the motor MT and the pickup roller 33 as viewed in the left-right direction. In the present embodiment, the left-right direction corresponds to the "first direction."

The driving force transmitting mechanism MD comprises gears G1 to G7 and an electromagnetic clutch EC.

The gear G1 is engaged with a motor gear MG provided on an output shaft of the motor MT.

The gear G2 is engaged with the gear G1.

The gear G3 is engaged with the gear G2.

The gear G4 is engaged with the gear G3.

The gear G5 is engaged with the gear G4.

The gear G6 is engaged with the gear G5.

The gear G7 is engaged with the gear G6.

The driving force of the motor MT is input to the electromagnetic clutch EC via the gear G7. The electromagnetic clutch EC is switchable to a transmitting state and to a disconnected state. The electromagnetic clutch EC is in the transmitting state when energized, and is in the disconnected state when not energized. The transmitting state is a state in which the driving force of the motor MT is transmitted to the pickup roller 33. The disconnected state is a state in which the driving force of the motor MT is not transmitted to the pickup roller 33.

The second circuit board 220 comprises a central processing unit (CPU) 221 configured to control the operation of the sheet feeder unit 30, the image forming unit 40, and other components. The CPU 221 energizes the electromagnetic clutch EC for a predetermined time to cause the pickup roller 33 to convey the sheet S in the sheet tray 31 toward the image forming unit 40.

The image forming apparatus 1 further comprises a gear G10. The gear G10 is engaged with the gear G1. Though not shown in the drawings, the driving force of the motor is transmitted via the gears G1 and G10 to the photosensitive drum 61, the development roller 64, the pressure roller 72, the ejection roller 81, and other components.

The first circuit board 210 is a circuit board removably installed in the main housing 10. In other words, the first circuit board 210 is a replaceable circuit board. As an example, the first circuit board 210 comprises a DC-DC converter 211. The DC-DC converter 211, for example, converts a 24V DC voltage, output from an AC-DC converter (not shown) that converts an AC voltage supplied from a commercial power source into a DC voltage, into a 3.3V DC voltage and supplies the converted DC voltage to the second circuit board 220 and other components.

The motor MT is positioned between the first circuit board 210 installed in the main housing 10 and the pickup roller 33 as viewed in the left-right direction. In other words, the first circuit board 210 is positioned on a side of the motor MT opposite to a side on which the pickup roller 33 is positioned in the front-rear direction. The first circuit board 210 is positioned on a side of the motor MT opposite to a side on which the driving force transmitting mechanism MD is positioned in the front-rear direction.

The second circuit board 220 is a circuit board installed in the main housing 10. The second circuit board 220 is fixed to the main housing 10 by screws or the like. The second circuit board 220 is electrically connected to the first circuit board 210 when the first circuit board 210 is installed in the main housing 10.

To be more specific, the first circuit board 210 comprises a first connector C1. When the first circuit board 210 is installed in the main housing 10, an engaging surface of the first connector C1 faces in a direction in which the first circuit board 210 is installed into the main housing 10. More specifically, the engaging surface of the first connector C1 faces upward when the first circuit board is installed in the main housing 10.

The second circuit board 220 comprises a second connector C2. The second connector C2 is directly connected to the first connector C1 of the first circuit board 210 when the first circuit board 210 is installed in the main housing 10. An engaging surface of the second connector C2 faces in a direction opposite to the direction in which the first circuit board 210 is installed into the main housing 10. More specifically, the engaging surface of the second connector C2 faces downward. The first circuit board 210 and the second circuit board 220 are electrically connected via the first connector C1 and the second connector C2.

The first connector C1 and the second connector C2 are board-to-board connectors that connect circuit boards to each other. At least one of the first connector C1 or the second connector C2 may be a floating connector configured to absorb misalignment upon engagement by moving with respect to the first circuit board 210 and the second circuit board 220.

Figure 3A:
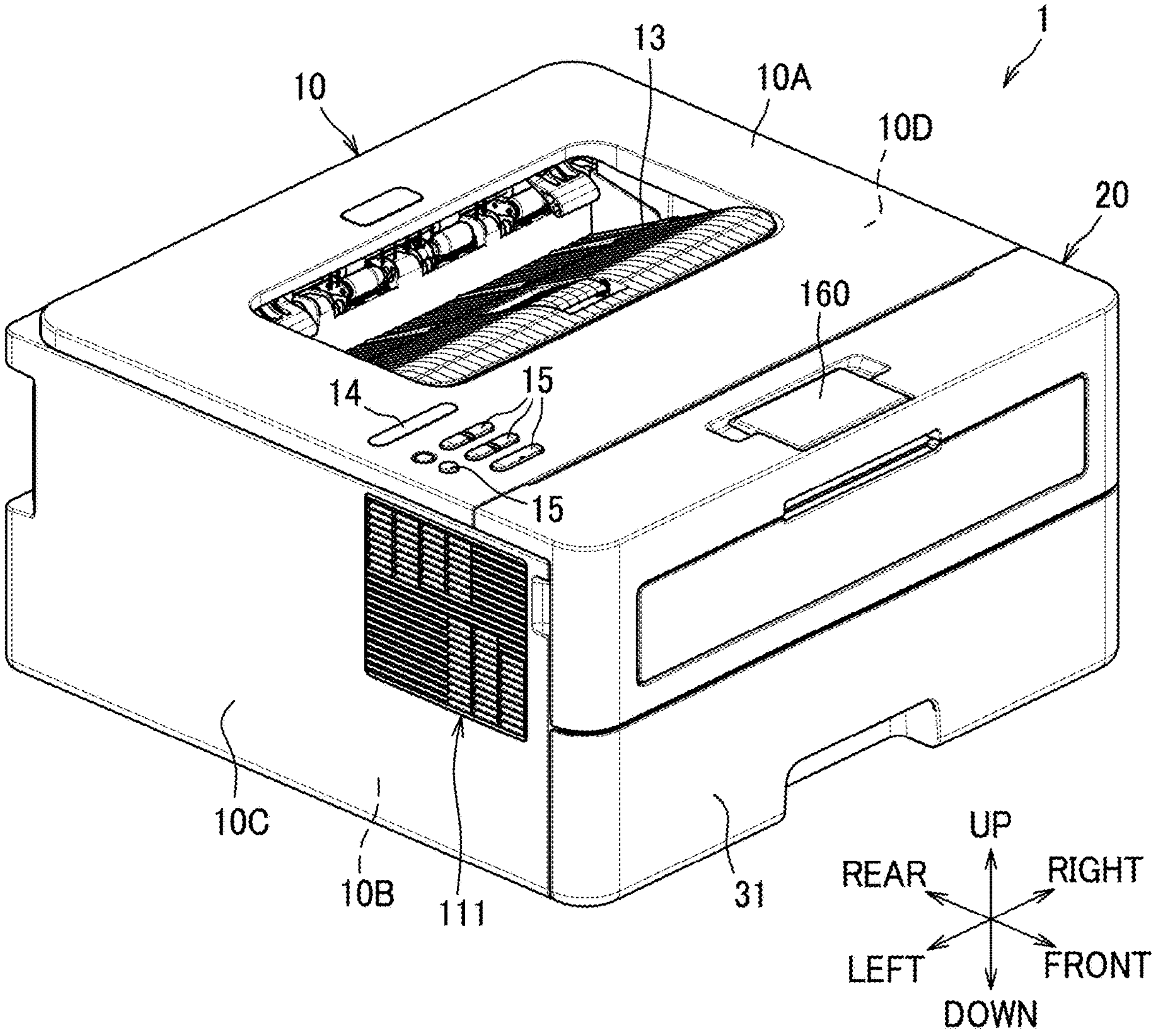
FIG. 3A is a perspective view of the image forming apparatus.

As shown in FIG. 3A, the main housing 10 has a top surface 10A, a bottom surface 10B, and a plurality of side surfaces 10C and 10D. The plurality of side surfaces 10C and 10D includes a left-side surface 10C and a right-side surface 10D. The right-side surface 10D is positioned on a side of the image forming unit 40 opposite to a side on which the left side surface 10C is positioned (refer to FIG. 1). In the present embodiment, the left-side surface 10C corresponds to the "first side surface." The right-side surface 10D corresponds to the "second side surface."

The image forming apparatus 1 comprises a display 14 and a plurality of elastic members 15.

The display 14 is a display on which information is shown. For example, the display 14 is a liquid crystal display (LCD). The display 14 is provided facing upward.

Figure 3B:
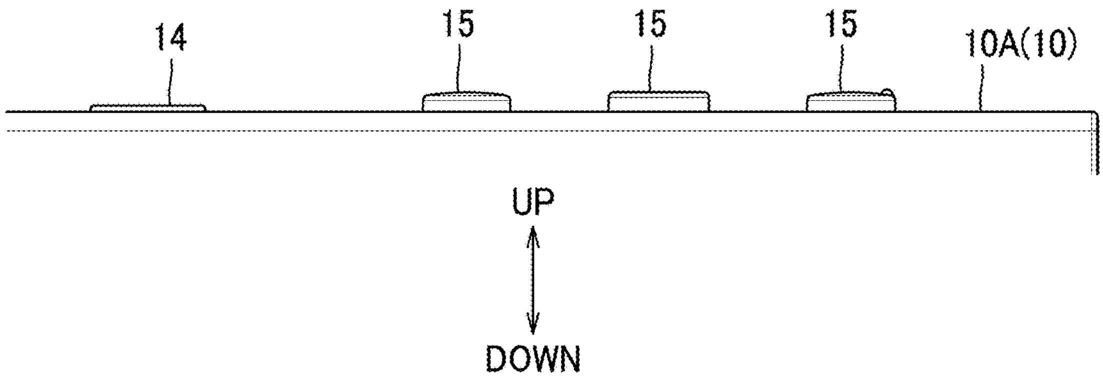
FIG. 3B is an enlarged side view showing a display and an elastic member.

The elastic members 15 are buttons for operating the image forming apparatus 1. As an example, the elastic members 15 are made of rubber. The elastic members 15 are positioned at a position frontward of the display 14. As shown in FIG. 3B, each elastic member 15 protrudes upward to a height higher than a height of the display 14 and a height of the top surface 10A of the main housing 10.

Figure 4:
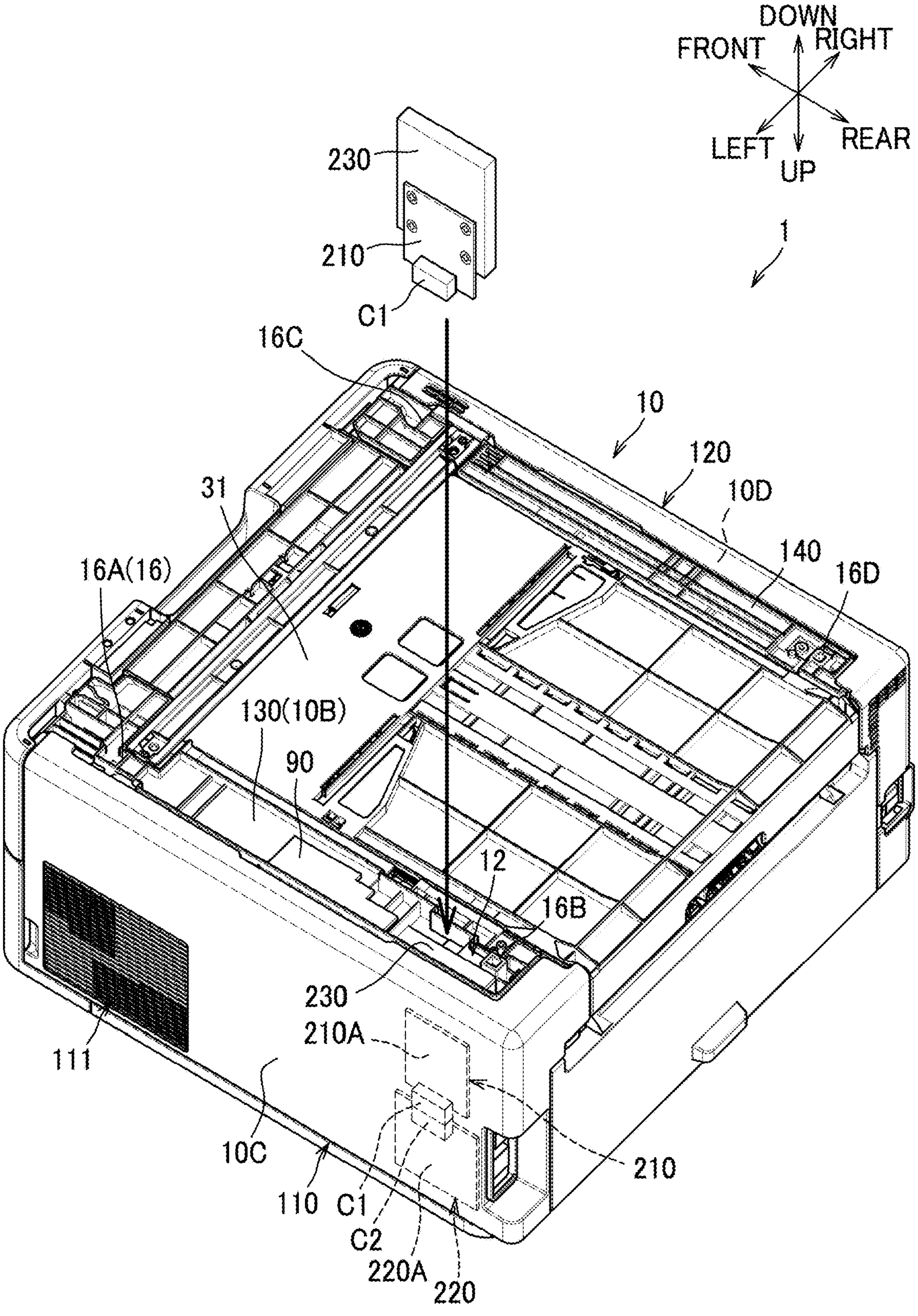
FIG. 4 is a perspective view of the image forming apparatus as viewed from a bottom-surface side of the image forming apparatus.

As shown in FIG. 4, the main housing 10 comprises a first side cover 110, a second side cover 120, a first side frame 130, and a second side frame 140.

The first side cover 110 and the second side cover 120 form an exterior surface of the image forming apparatus 1. The first side cover 110 forms the left-side surface 10C of the main housing 10. The second side cover 120 forms the right-side surface 10D of the main housing 10.

The first side cover 110 and the second side cover 120 are opposed to each other in the left-right direction (first direction). The image forming unit 40 (refer to FIG. 1) and the sheet tray 31 are positioned between the first side cover 110 and the second side cover 120 in the left-right direction.

The first circuit board 210 has a mounting surface 210A on which main electrical components such as the DC-DC converter 211 are mounted. The mounting surface 210A is perpendicular to the left-right direction when the first circuit board 210 is installed in the main housing 10. The mounting surface 210A of the first circuit board 210 and the first side cover 110 face each other in the first direction when the first circuit board 210 is installed in the main housing 10.

The second circuit board 220 has a mounting surface 220A on which main electrical components such as the CPU 221 are mounted. The mounting surface 220A is perpendicular to the left-right direction. The mounting surface 220A of the second circuit board 220 and the first cover 110 face each other in the left-right direction.

The first side frame 130 and the second side frame 140 form a frame of the main housing 10. The first side frame 130 is positioned between the first side cover 110 and the sheet tray 31 in the left-right direction. The second side frame 140 is positioned between the second side cover 120 and the sheet tray 31 in the left-right direction.

The first side frame 130 supports the motor MT (refer to FIG. 2), the driving force transmitting mechanism MD, the second circuit board 220, etc. The second circuit board 220 is fixed to the first side frame 130.

The main housing 10 includes an opening 12 in a bottom surface 10B. The opening 12 allows communication between the inside of the main housing 10 and the outside of the main housing 10. The opening 12 extends through the bottom surface 10B in an up-down direction. The opening 12 is an opening through which the first circuit board 210 passes when the first circuit board 210 is being installed into the main housing 10. The opening 12 is positioned between the first side cover 110 and the sheet tray 31 in the left-right direction. The opening 12 is positioned in a bottom surface of the side frame 130.

The main housing 10 has a contact surface 16 on the bottom surface 10B of the main housing 10. The contact surface 16 contacts a placement surface SF (refer to FIG. 1) on which the image forming apparatus 1 is placed when in use. More specifically, the contact surface 16 contacts the placement surface SF when the image forming apparatus 1 is placed on the placement surface SF with the top surface 10A facing upward and the bottom surface 10B facing downward. The contact surface 16 includes a first contact surface 16A, a second contact surface 16B, a third contact surface 16C, and a fourth contact surface 16D.

The first contact surface 16A and the second contact surface 16B are provided on a bottom surface of the first side frame 130. The first contact surface 16A is positioned at a front end portion of the first side frame 130 and the second contact surface 16B is positioned at a rear end portion of the first side frame 130. The third contact surface 16C and the fourth contact surface 16D are provided on a bottom surface of the second side frame 140. The third contact surface 16C is positioned at a front end portion of the second side frame 140 and the fourth contact surface 16D is positioned at a rear end portion of the second side frame 140.

Figure 5A:
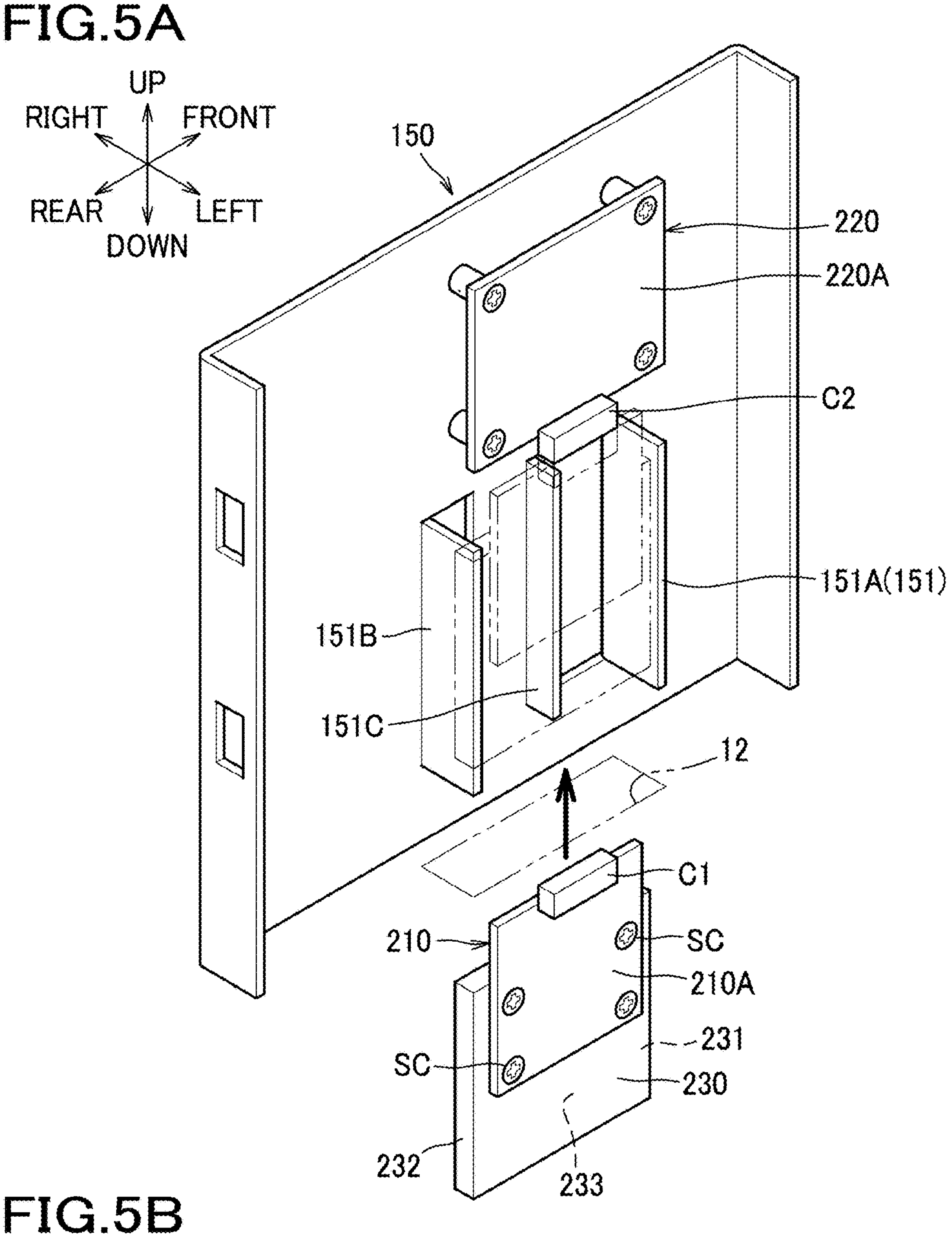
FIG. 5A and FIG. 5B are illustrations showing the first circuit board, a holder, the second circuit board, and a metal plate.

As shown in FIG. 5A, the holder 230 is a member that holds the first circuit board 210. For example, the first circuit board 210 is fixed to the holder 230 by screws SC. The holder 230 is removably installable into the main housing 10 through the opening 12 of the main housing 10 together with the first circuit board 210 held thereon.

A metal plate 150 is a member formed by bending a metal sheet. The metal plate 150 is accommodated in the main housing 10 (refer to FIG. 2). The metal plate 150 is fixed to the first side frame 130 (refer to FIG. 4) of the main housing 10 by screws or the like. In the present embodiment, the metal plate 150 is positioned between the first side frame 130 and the second circuit board 220 in the left-right direction. The metal plate 150 covers the second circuit board 220 from the right side. In other words, the metal plate 150 covers a surface of the second circuit board 220 opposite to the mounting surface 220A.

The second circuit board 220 is fixed to the metal plate 150. In other words, the second circuit board 220 is fixed to the first side frame 130 of the main housing 10 via the metal plate 150.

Figure 5B:
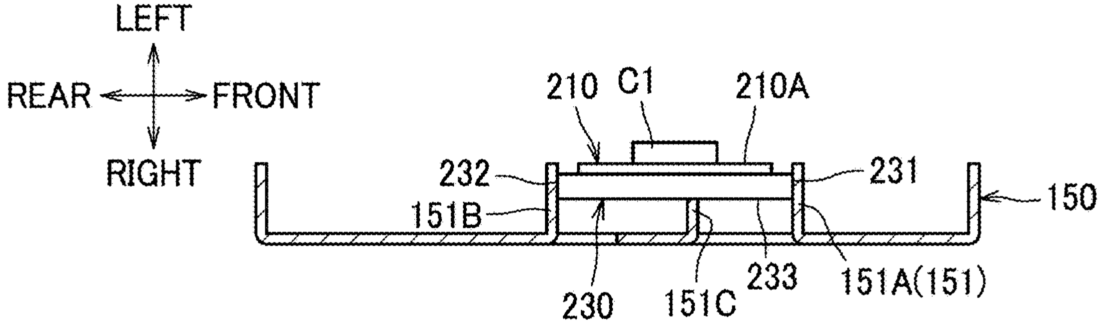

As shown in FIG. 5A and FIG. 5B, the metal plate 150 has an installation guide 151. The installation guide 151 has a function of guiding installation of the first circuit board 210 into the main housing 10. In the present embodiment, the installation guide 151 guides installation of the holder 230 to thereby guide installation of the first circuit board 210 held by the holder 230. The installation guide 151 is formed by lancing a portion of the metal plate 150.

The installation guide 151 has a first guide 151A, a second guide 151B, and a third guide 151C. The first guide 151A, the second guide 151B, and the third guide 151C extend in the up-down direction.

The first guide 151A guides a front-side surface 231 of the holder 230. The front guide 151A is positioned on the front side of the holder 230 and the first circuit board 210 when the holder 230 and the first circuit board 210 are installed in the main housing 10.

The second guide 151B guides a rear-side surface 232 of the holder 230. The second guide 151B is positioned on the rear side of the holder 230 and the first circuit board 210 when the holder 230 and the first circuit board 210 are installed in the main housing 10. The holder 230 and the first circuit board 210 are positioned between the first guide 151A and the second guide 151B in the front-rear direction when the holder 230 and the first circuit board 210 are installed in the main housing 10. In the present embodiment, a dimension of the first guide 151A in the left-right direction and a dimension of the second guide 151B in the left-right direction is approximately the same.

The third guide 151C guides a right-side surface 233 of the holder 230. The third guide 151C is positioned between the first guide 151A and the second guide 151B in the front-rear direction. The third guide 151C is positioned on the right side of the holder 230 and the first circuit board 210 when the holder 230 and the first circuit board 210 are installed in the main housing 10. A dimension of the third guide 151C in the left-right direction is smaller than the dimensions of the first guide 151A and the second guide 151B in the left-right direction.

Figure 6A:
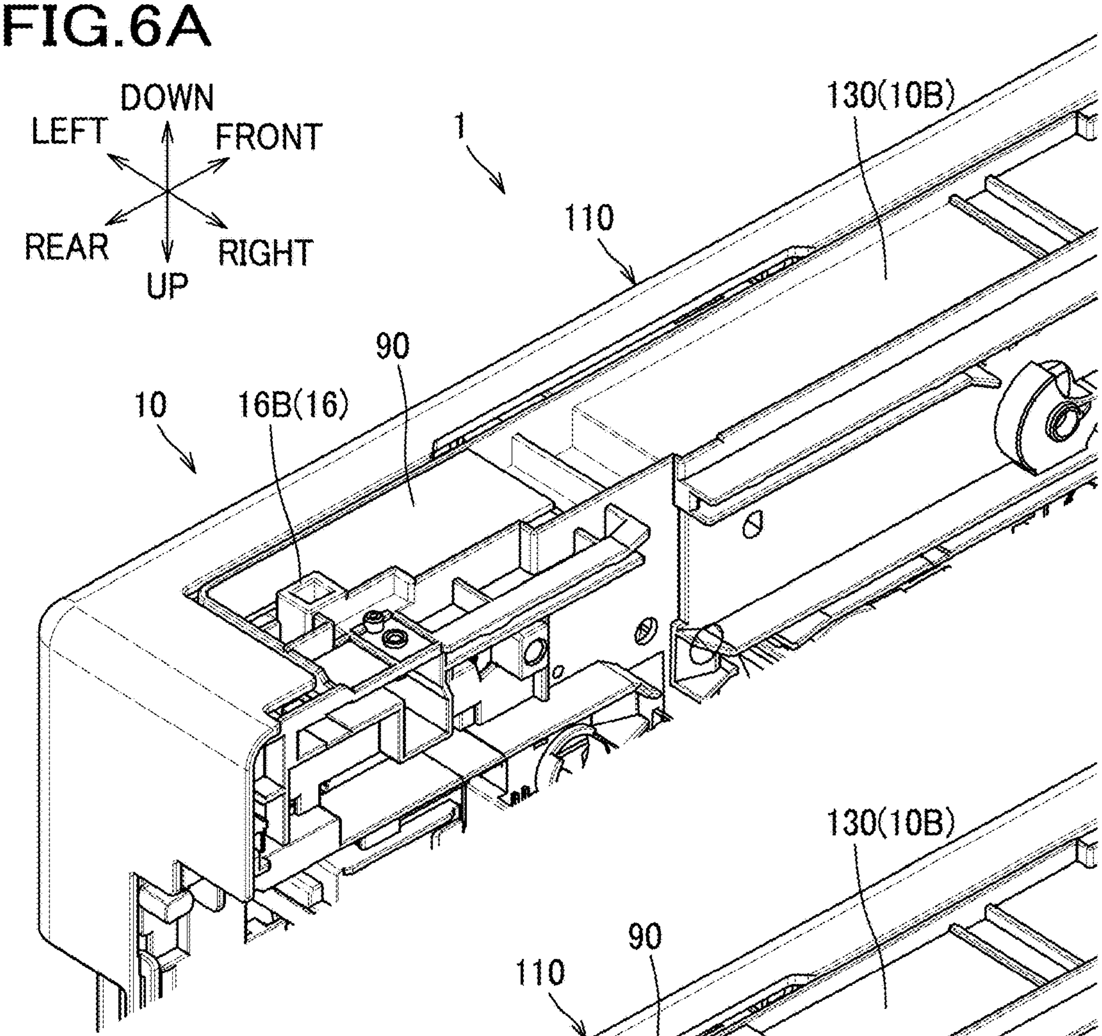
FIG. 6A is a perspective view showing a cover in the closed position.
Figure 6B:
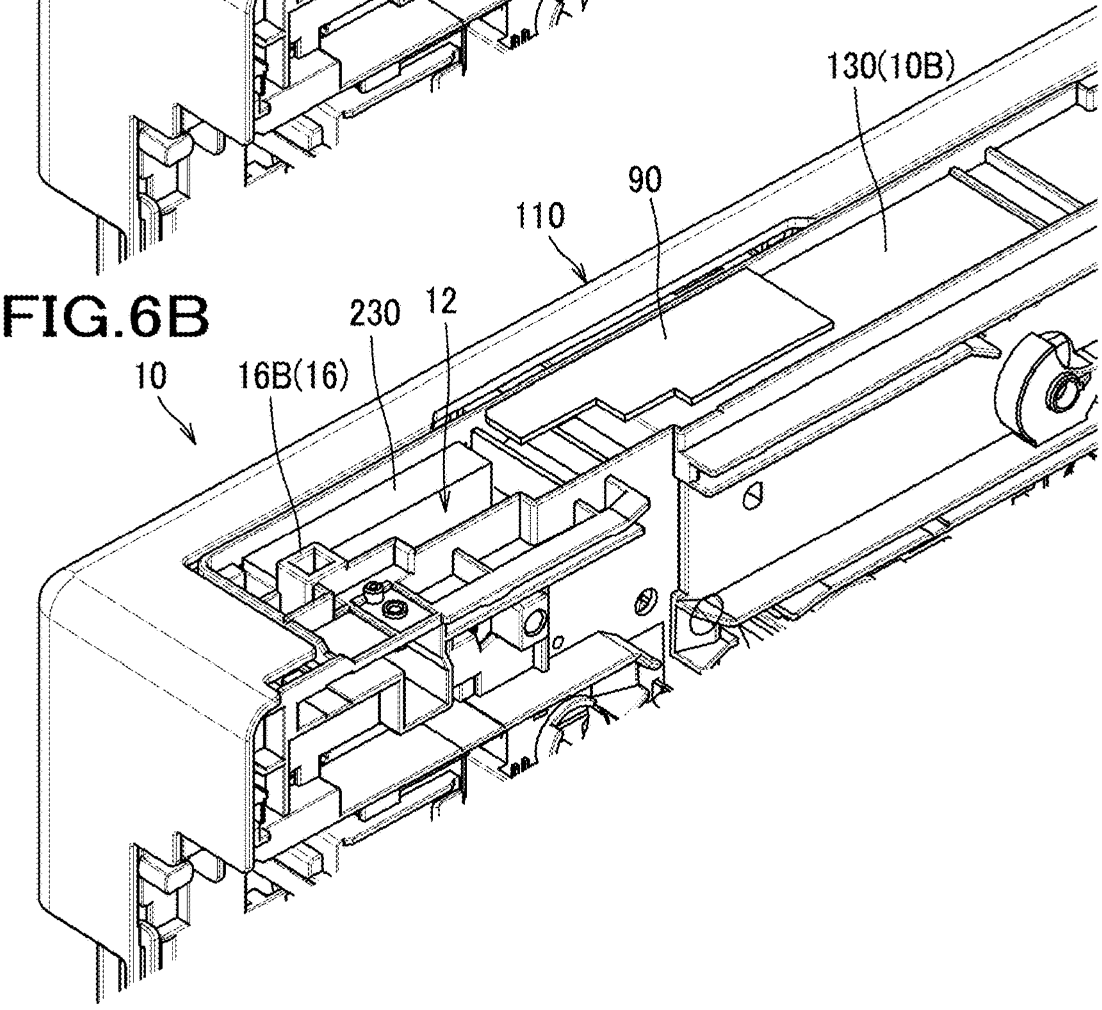
FIG. 6B is a perspective view showing the cover in the open position.

As shown in FIG. 6A and FIG. 6B, the image forming apparatus 1 further comprises a cover 90. The cover 90 covers and uncovers the opening 12 of the main housing 10. The cover 90 is movable with respect to the main housing 10 between a closed position shown in FIG. 6A and an open position shown in FIG. 6B. The closed position is a position in which the opening 12 is covered. The open position is a position in which the opening 12 is uncovered.

In the first embodiment, the cover 90 is slidable between the open position and the closed position with respect to the main housing 10. The cover 90 is slidable in the front-rear direction with respect to the main housing 10. The cover 90 is slidably supported by the main housing 10. More specifically, the cover 90 is slidably supported by the first side frame 130.

The cover 90 in the closed position is positioned above the contact surface 16. In the first embodiment, the cover 90 in the open position is also positioned above the contact surface 16.

Figure 7:
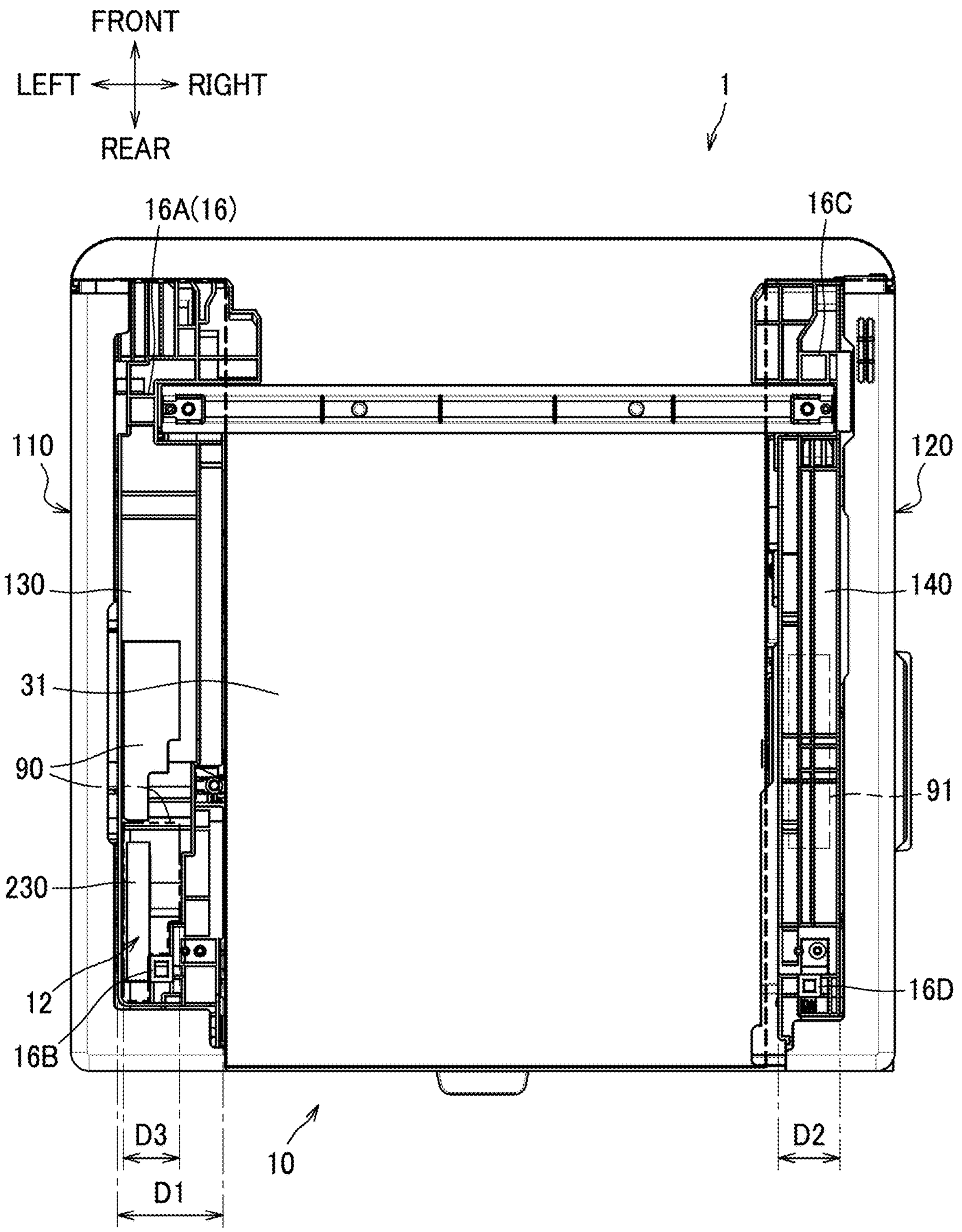
FIG. 7 is an illustration showing the image forming apparatus as viewed from the bottom-surface side of the image forming apparatus.

As shown by the imaginary line in FIG. 7, the cover 90 positioned in the closed position is positioned between the first side cover 110 and the sheet tray 31 in the left-right direction. Further, as shown by the solid line in FIG. 7, the cover 90 positioned in the open position is also positioned between the first side cover 110 and the sheet tray 31 in the left-right direction.

A dimension D1 of the first side frame 130 in the left-right direction is larger than a dimension D2 of the second side frame in the left-right direction. A dimension D3 of the opening 12 in the left-right direction is smaller than the dimension D1 of the first side frame 130 in the left-right direction.

Figure 8A:
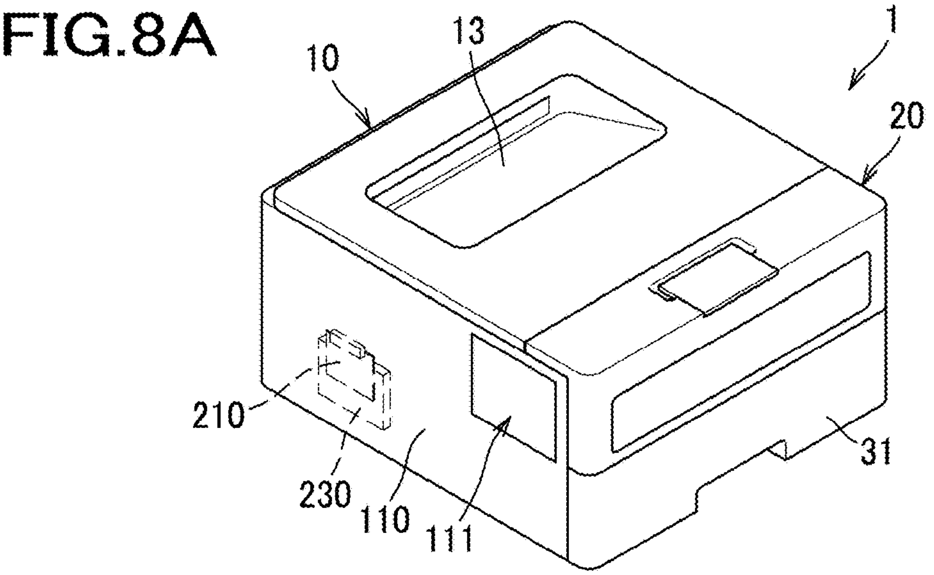
FIG. 8A is a perspective view of the image forming apparatus as viewed from the left side.
Figure 8B:
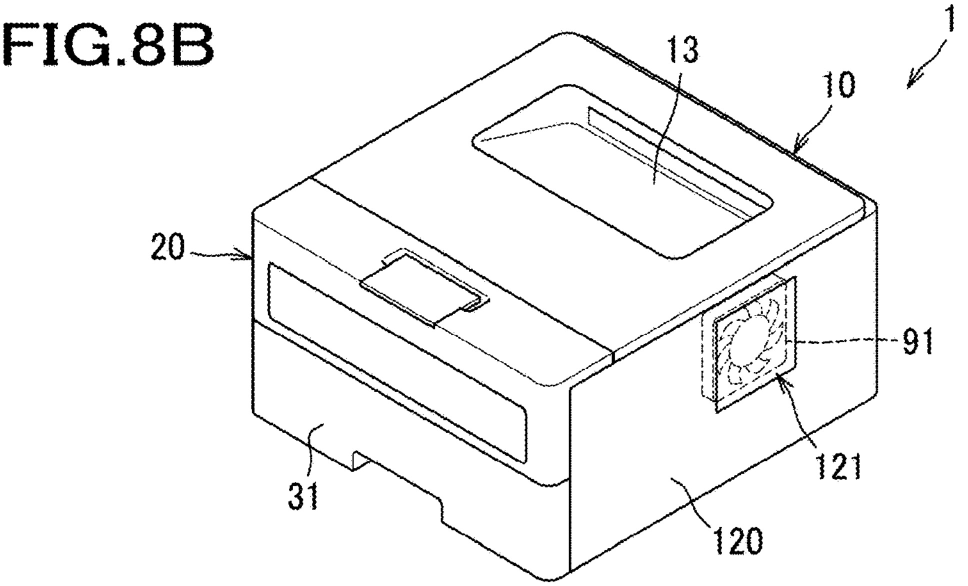
FIG. 8B is a perspective view of the image forming apparatus as viewed from the right side.

As shown in FIG. 8A and FIG. 8B, the first side cover 110 includes an air inlet 111. The second side cover 120 includes an air outlet 121. The image forming apparatus 1 further comprises a fan 91.

The fan 91 generates an air flow flowing from the air inlet 111 toward the air outlet 121 inside the main housing 10. The fan 91 is positioned inside the main housing 10. The fan 91 is supported by the second side frame 140 (refer to FIG. 7). The fan 91 is positioned closer to the second side cover 120 than to the first side cover 110 inside the main housing 10.

Figure 8C:
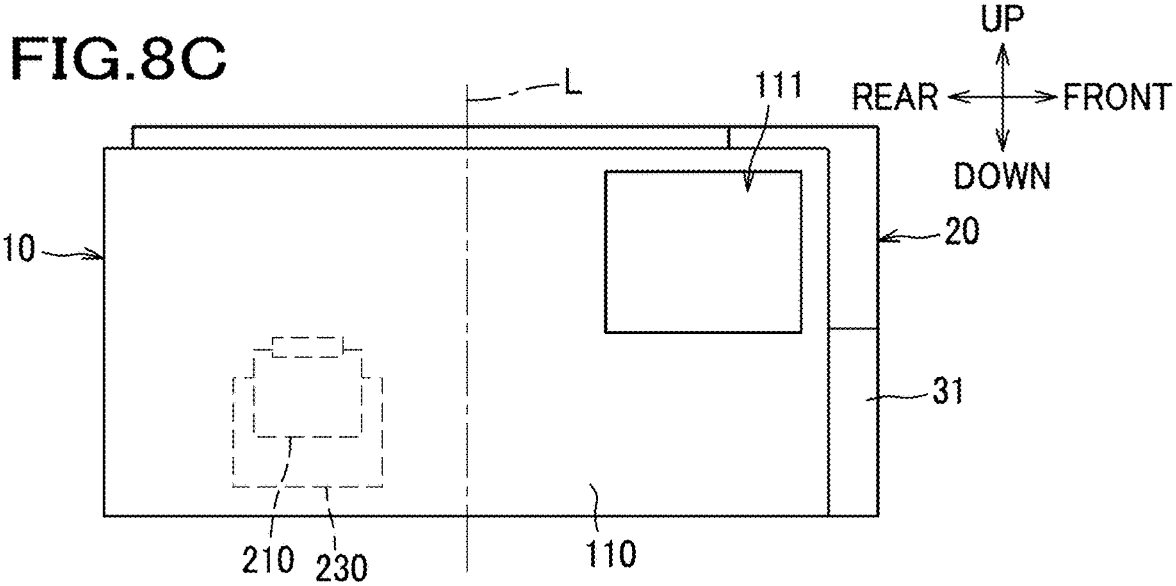
FIG. 8C is a side view of the image forming apparatus as viewed from the left side.

As shown in FIG. 8C, the air inlet 111 is positioned on one side of a vertical line L running through a central portion of the first side cover 110 in the front-rear direction (horizontal direction), as viewed in the left-right direction. The first circuit board 210 installed in the main housing 10 is positioned on the other side of the vertical line L, as viewed in the left-right direction. More specifically, the air inlet 111 is positioned on the front side of the vertical line L as viewed in the left-right direction. The first circuit board 210 is positioned on the rear side of the vertical line L as viewed in the left-right direction.

As shown in FIG. 4, when replacing the first circuit board 210, first, the image forming apparatus 1 is placed upside down on the placement surface SF (refer to FIG. 1). Next, the cover 90 is moved from the closed position to the open position. Then, the holder 230 is held and pulled out upward (downward in FIG. 4). Accordingly, the holder 230 and the first circuit board 210 are removed from the main housing 10 through the opening 12 positioned in the bottom surface 10B of the main housing 10.

Next, the holder 230 of a new first circuit board 210 is held and moved downward (upward in FIG. 4) toward the opening 12 to install the first circuit board 210 and the holder 230 into the main housing 10 through the opening 12. Then, by engaging the first connector C1 of the first circuit board 210 with the second connector C2 of the second circuit board, the first circuit board 210 and the holder 230 are installed in the main housing 10. Subsequently, the cover 90 is moved from the open position to the closed position and the image forming apparatus 1 is placed on the placement surface SF with the bottom surface 10B of the main housing 10 facing downward.

Next, advantageous effects of the first embodiment will be described.

The first circuit board 210 can be replaced through the small opening 12 positioned in the bottom surface 10B of the main housing 10 between the first side cover 110 and the sheet tray 31 in the left-right direction; therefore, the first circuit board 210 can be easily replaced from the bottom surface 10B of the main housing 10. Further, there is no need to widely open the bottom surface of the main housing when replacing the circuit board as in a configuration known in the art; therefore, the first circuit board 210 can be easily replaced from the bottom surface 10B of the main housing 10.

The image forming apparatus 1 comprises the cover 90 that covers the opening 12; therefore, dust can be restrained from entering the main housing 10 through the opening 12. The cover 90 is positioned above the contact surface 16 of the main housing 10 when it is in the closed position; therefore, it is possible to restrain a force from being exerted on the cover 90 when the image forming apparatus 1 is placed on the placement surface SF.

The cover 90 is positioned between the first side cover 110 and the sheet tray 31 in the left-right direction when it is in the open position; therefore, the cover can be restrained from protruding outward (leftward) of the first side cover 110 in the left-right direction even when the cover is in the open position.

The cover 90 is slidable with respect to the main housing 10 between the open position and the closed position; therefore, the cover 90 can be restrained from protruding downward of the contact surface 16 even when the cover 90 is positioned in the closed position.

The image forming apparatus 1 comprises the holder 230 that holds the first circuit board 210 and is installable into and removable from the main housing 10 together with the first circuit board 210 held thereon; therefore, the first circuit board 210 can be installed into and removed from the main housing 10 by holding the holder 230.

The first circuit board 210 comprises the first connector C1 and the second circuit board 220 comprises the second connector C2; therefore, the first circuit board 210 and the second circuit board 220 can be easily electrically connected. Accordingly, the first circuit board 210 can be easily replaced.

The engagement surface of the first connector C1 faces the direction in which the first circuit board 210 is installed; therefore, the first connector C1 can be easily engaged with the second connector C2 of the second circuit board 220 when the first circuit board 210 is being installed into the main housing 10.

The first circuit board 210 comprises the DC-DC converter 211; therefore, the DC-DC converter 211 can be replaced when the first circuit board 210 is replaced.

The metal plate 150 comprises the installation guide 151; therefore, the first circuit board 210 can be installed and removed along the installation guide 151. Accordingly, the first circuit board 210 can be stably installed into and removed from the main housing 10.

The dimension D3 of the opening 12 positioned in the bottom surface of the first side frame 130 in the left-right direction is smaller than the dimension D1 of the first side frame 130 in the left-right direction; therefore, the first circuit board 210 can be restrained from interfering with members around the first side frame 130 when the first circuit board 210 is installed into and removed from the main housing 10.

The motor MT is positioned between the first circuit board 210 and the pickup roller 33 as viewed in the left-right direction, and the driving force transmitting mechanism MD is positioned between the motor MT and the pickup roller 33 as viewed in the left-right direction; therefore, the first circuit board 210 can be restrained from interfering with the driving force transmitting mechanism MD when the first circuit board 210 is installed into and removed from the main housing 10. More specifically, the first circuit board 210 can be restrained from interfering with the gears G1 to G7, and other components.

The dimension D1 of the first side frame 130 having the opening 12 positioned in the bottom surface thereof, in the left-right direction, is greater than the dimension D2 of the second side frame 140 in the left-right direction; therefore, space can be provided for the dimension D3 of the opening 12 in the left-right direction. Accordingly, the first circuit board 210 can be easily installed into and removed from the main housing 10 through the opening 12.

The air inlet 111 is positioned on one side of the vertical line L running through the central portion of the first side cover 110 in the front-rear direction, and the first circuit board 210 is positioned on the other side of the vertical line L; therefore, the air inlet 111 and the first circuit board 210 can be positioned apart from each other. Accordingly, dust sucked into the main housing 10 through the air inlet 111 can be restrained from adhering to the first circuit board 210.

The elastic member 15 protrudes upward to a height higher than the height of the display 14 and the height of the top surface 10A of the main housing 10; therefore, the elastic member 15 contacts the placement surface SF for the image forming apparatus 1 when the image forming apparatus 1 is placed upside down on the placement surface SF to replace the first circuit board 210. Accordingly, it is possible to restrain a force from being exerted on the display 14. In addition, since the elastic member 15 contacts the placement surface SF when the image forming apparatus 1 is placed upside down on the placement surface SF, the impact on the image forming apparatus 1 when the image forming apparatus 1 is placed upside down can be softened.

The elastic member 15 is the button for operating the image forming apparatus 1; therefore, the number of components can be reduced, for example, compared to an alternative configuration in which an elastic member and a button are provided separately.

Figure 9A:
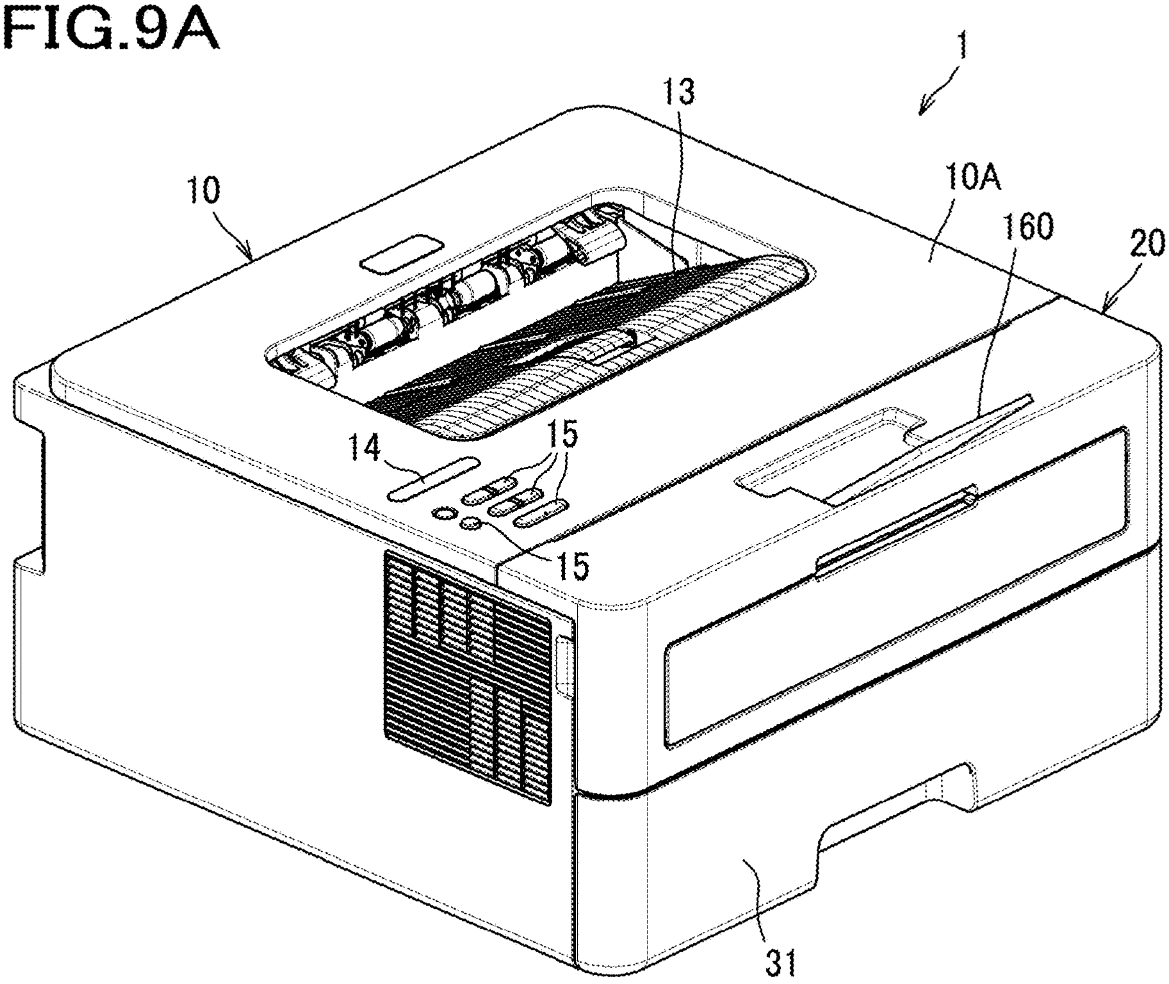
FIG. 9A is a perspective view of the image forming apparatus with an ejection stopper positioned in the use position.

As shown in FIG. 9A, the image forming apparatus 1 further comprises an ejection stopper 160 at the front side of the ejection tray 13 to restrain the sheet S from falling off from the ejection tray 13. The ejection stopper 160 is rotatable between a retracted position shown in FIG. 3A and a use position shown in FIG. 9A. More specifically, the ejection stopper 160 is rotatable about a rotation axis extending in the left-right direction and positioned at a lower end portion of the ejection stopper 160 positioned in the use position, and is rotatable between the retracted position and the use position with respect to the main housing 10.

Figure 9B:
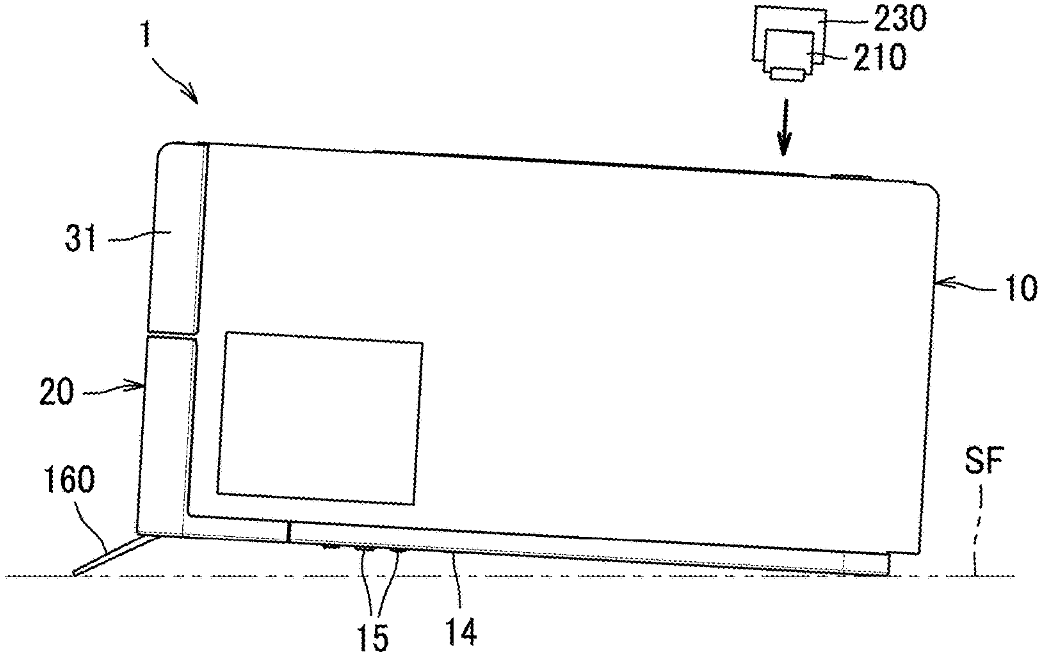
FIG. 9B is a side view of the image forming apparatus placed upside down on the placement surface with the ejection stopper positioned in the use position.

As shown in FIG. 9B, the ejection stopper 160 may be provided so as to be capable of supporting the image forming apparatus 1 when the image forming apparatus 1 is placed upside down on the placement surface SF with the ejection stopper 160 positioned in the use position. A gap will be formed between the placement surface SF and the display 14 so that it is possible to restrain force from being exerted on the display 14.

Next, a second embodiment will be described below. The following description focuses on features different from those described above in connection with the first embodiment. For the same or substantially the same features, the corresponding elements will be designated by the same reference characters used in the first embodiment, and descriptions thereof will be omitted.

Figure 10A:
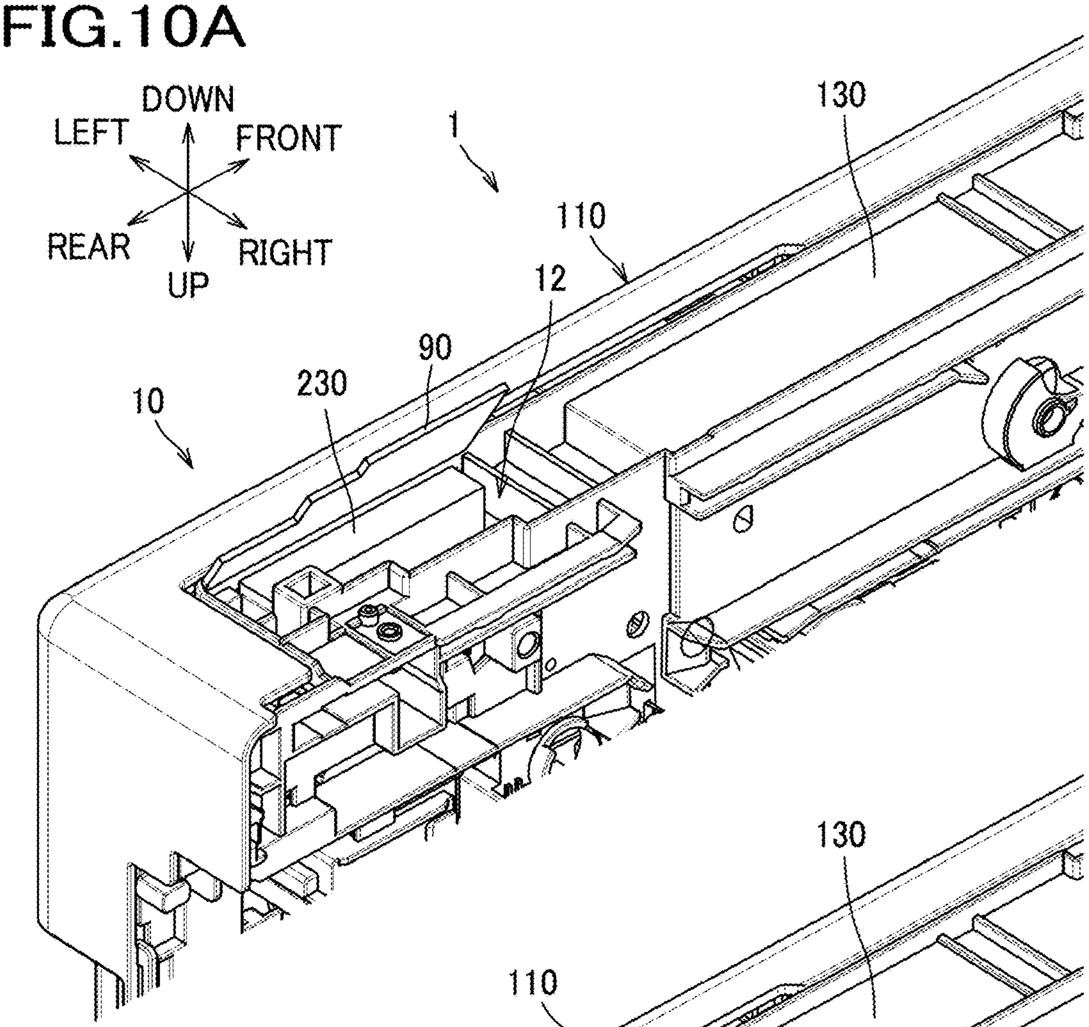
FIG. 10A is a perspective view showing a cover of the image forming apparatus according to a second embodiment.

As shown in FIG. 10A, in the second embodiment, the cover 90 is rotatable with respect to the main housing 10 between a closed position (refer to FIG. 6A) and an open position. The cover 90 is rotatably supported by the main housing 10. More specifically, the cover 90 is rotatable with respect to the main housing 10 between the closed position and the open position, about a rotation axis extending in the front-rear direction and positioned at a left end portion of the cover 90.

In the second embodiment, since the cover 90 is rotatable with respect to the main housing 10 between the open position and the closed position, it is easier to notice that the cover 90 is open compared to when the cover is slidable.

Figure 10B:
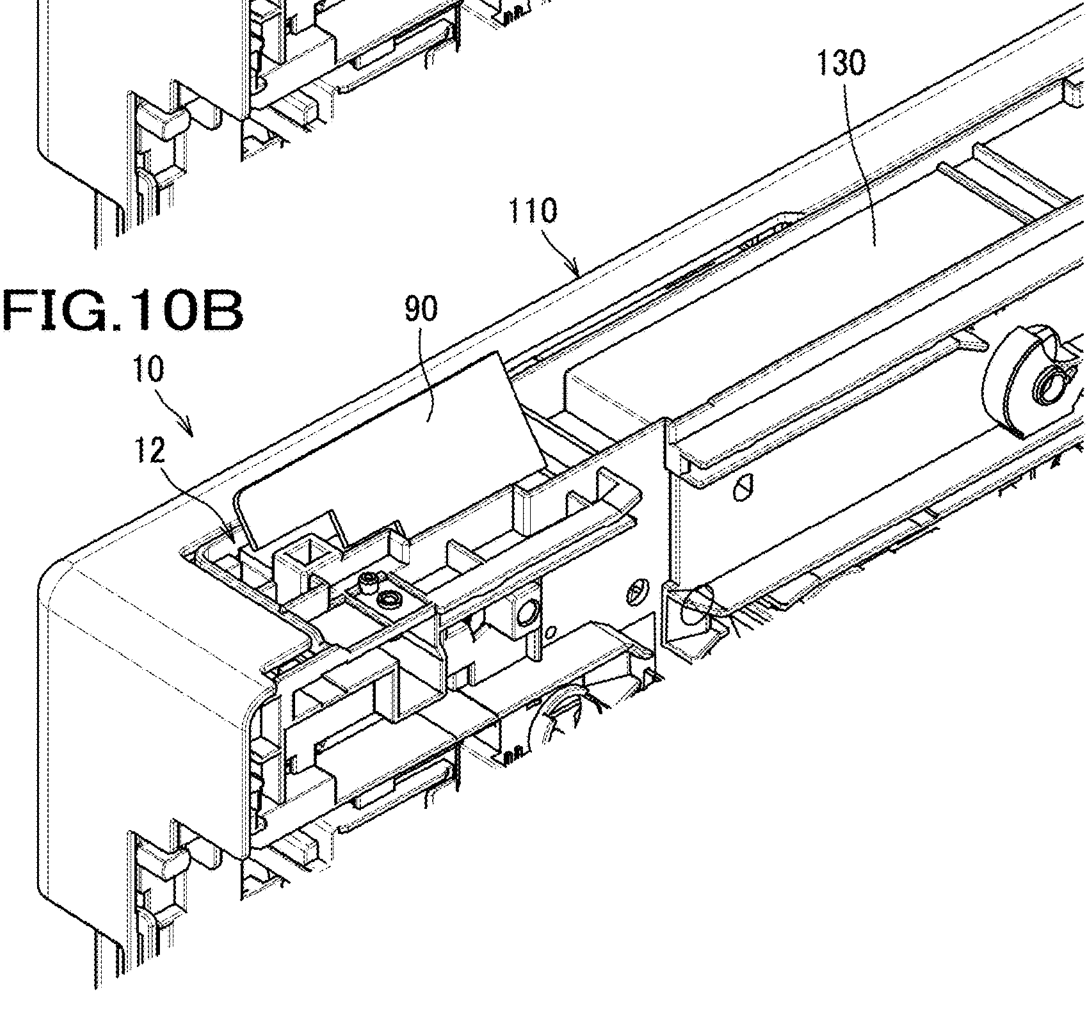
FIG. 10B is a perspective view showing a modified example of the cover.

Furthermore, as shown in FIG. 10B, the cover 90 may be rotatable with respect to the main housing between a closed position and an open position, about a rotation axis extending in the front-rear direction and positioned at a right end portion of the cover 90. In addition, though not shown in the figures, the cover 90 may be rotatable with respect to the main housing 10 between a closed position and an open position, about a rotation axis extending in the left-right direction and positioned at a front-end portion or a rear-end portion of the cover 90.

The rotatable cover 90 may be configured, for example, to rotate from the open position to the closed position upon contact with the placement surface SF when the image forming apparatus 1 is placed on the placement surface SF even if the user forgets to close the cover 90.

Next, a third embodiment will be described below.

Figure 11A:
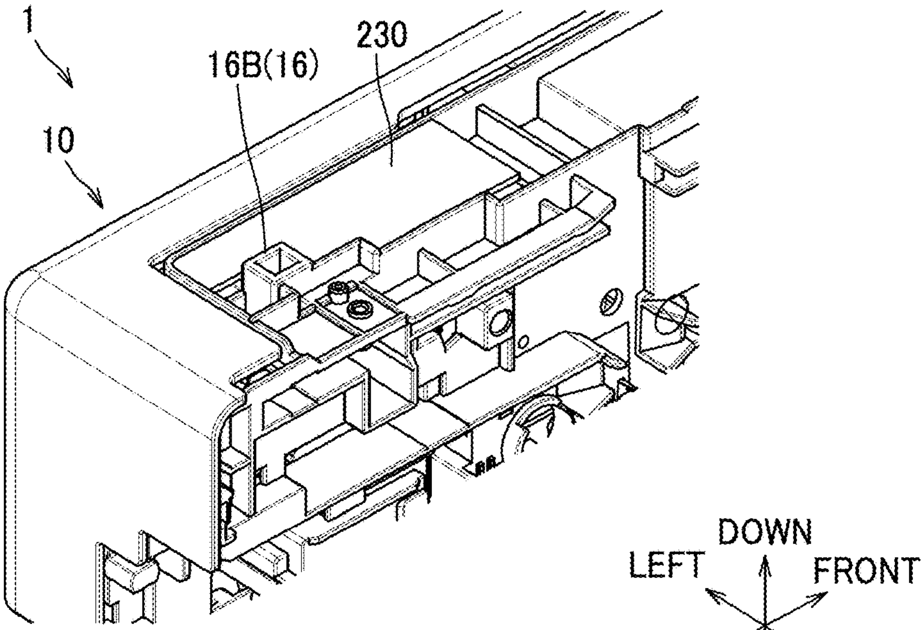
FIG. 11A and FIG. 11B are perspective views showing a holder of an image forming apparatus according to a third embodiment.
Figure 11B:
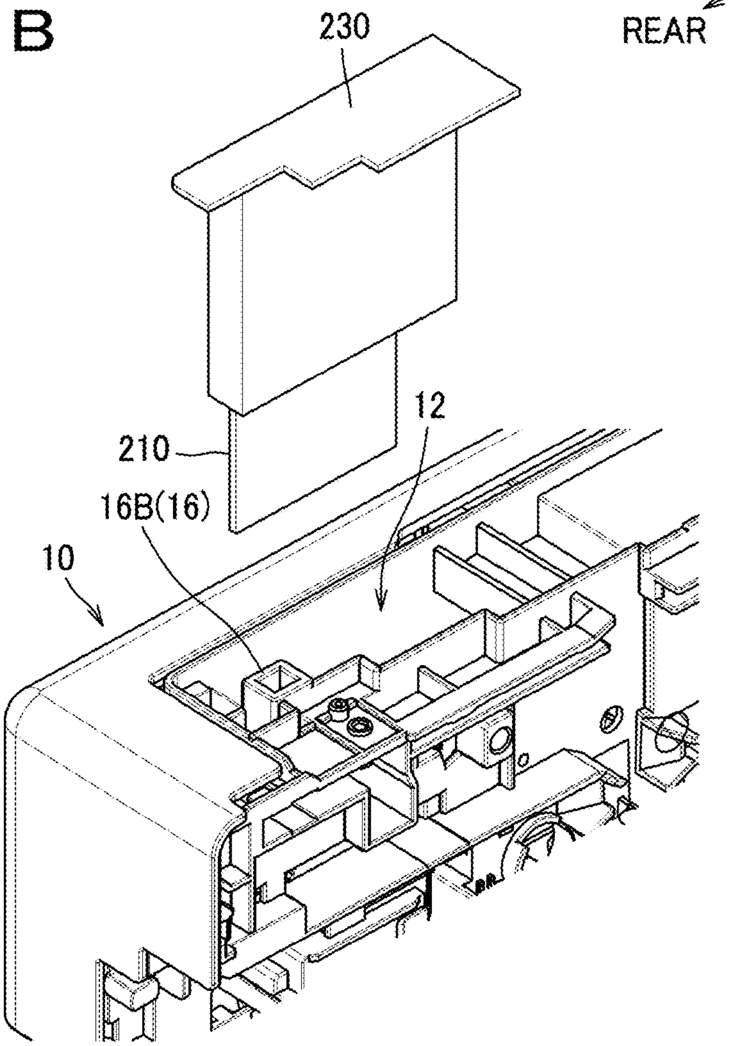

As shown in FIG. 11A, in the third embodiment, the holder 230 holding the first circuit board 210 covers the opening 12 of the main housing 10 when it is installed in the main housing 10 together with the first circuit board 210 held thereon. In addition, as shown in FIG. 11B, the holder 230 uncovers the opening 10 when it is removed from the main housing 10 together with the first circuit board 210 held thereon. In the third embodiment, the image forming apparatus 1 does not comprise a cover that covers and uncovers the opening 12.

The holder 230 is positioned above the contact surface 16 when it is installed in the main housing 10. In other words, the holder 230 is positioned above the contact surface 16 when the holder 230 covers the opening 12 of the main housing 10.

In the third embodiment, the holder 20 covers and uncovers the opening 12 of the main housing 10; therefore, there is no need to provide a separate cover that covers and uncovers the opening 12. In addition, effort is saved when replacing the first circuit board 210 because there is no need to cover and uncover the opening 12 when replacing the first circuit board 210. In addition, since the holder 230 covers the opening 12 of the main housing 10, dust can be restrained from entering the main housing 10 through the opening 12.

Since the holder 230 is positioned above the contact surface 16 when it is installed in the main housing 10, it is possible to restrain a force from being exerted on the holder 230 and the first circuit board 210 when the image forming apparatus 1 is placed on the placement surface SF.

Next, a fourth embodiment will be described below.

Figure 12A:
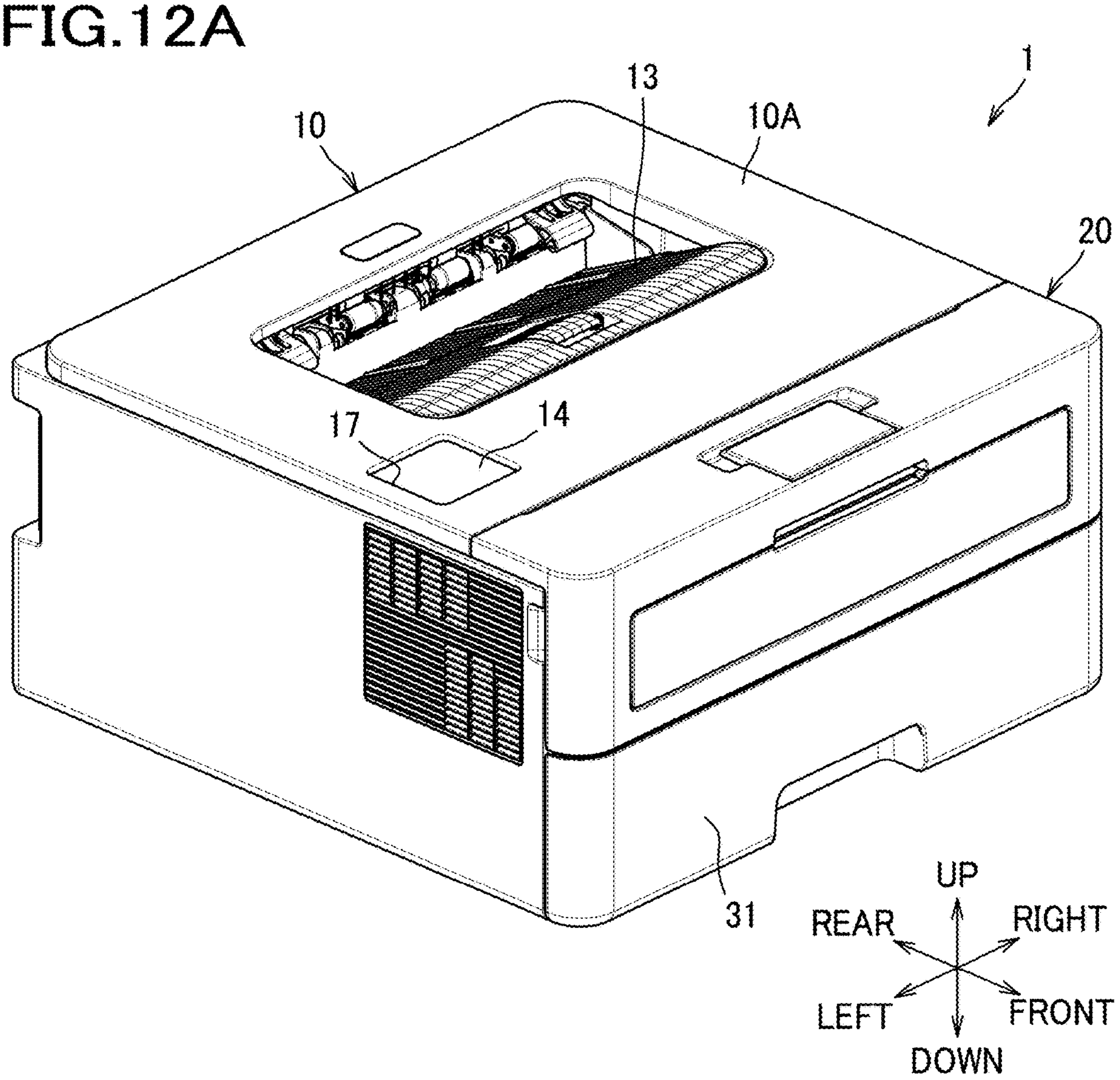
FIG. 12A is a perspective view showing an image forming apparatus according to a fourth embodiment.
Figure 12B:
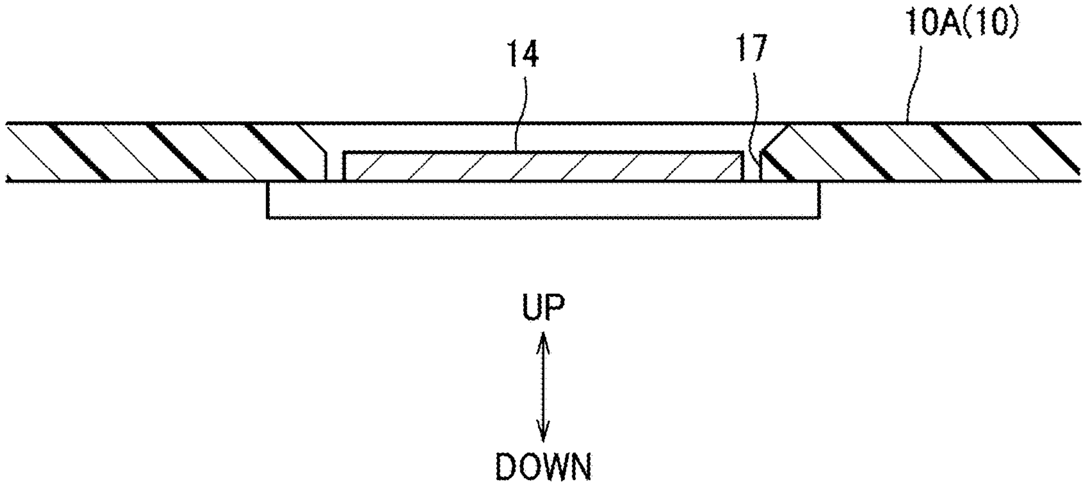
FIG. 12B is an illustration showing a positional relationship between a top surface of the main housing and the display.

As shown in FIG. 12A and FIG. 12B, in the fourth embodiment, the image forming apparatus 1 does not comprise an elastic member as a button for operating the image forming apparatus 1. The display 14 is positioned inside a top opening 17 included in the top surface 10A and below the top surface 10A.

In the fourth embodiment, since the display 14 is positioned below the top surface 10A of the main housing 10, the top surface 10A contacts the placement surface SF for the image forming apparatus 1 even if the image forming apparatus 1 is placed upside down upon replacing the first circuit board 210. Accordingly, it is possible to restrain a force from being exerted on the display 14.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the elastic member may not be a button for operating the image forming apparatus, and may be a cushion to soften the impact on the image forming apparatus when the image forming apparatus is placed upside down. The image forming apparatus may not comprise the display.

The image forming apparatus may not comprise the holder holding the first circuit board. In this case, the first circuit board may be removably installed directly in the main housing through an opening of the main housing.

In the above-described embodiment, the metal plate 150 comprises the installation guide 151; however, for example, the first side frame may comprise the installation guide for guiding installation of the first circuit board. The image forming apparatus may not comprise the installation guide.

The cover in the open position may protrude outwardly in the first direction from the position between the first side cover and the sheet tray in the first direction.

Figure 13:
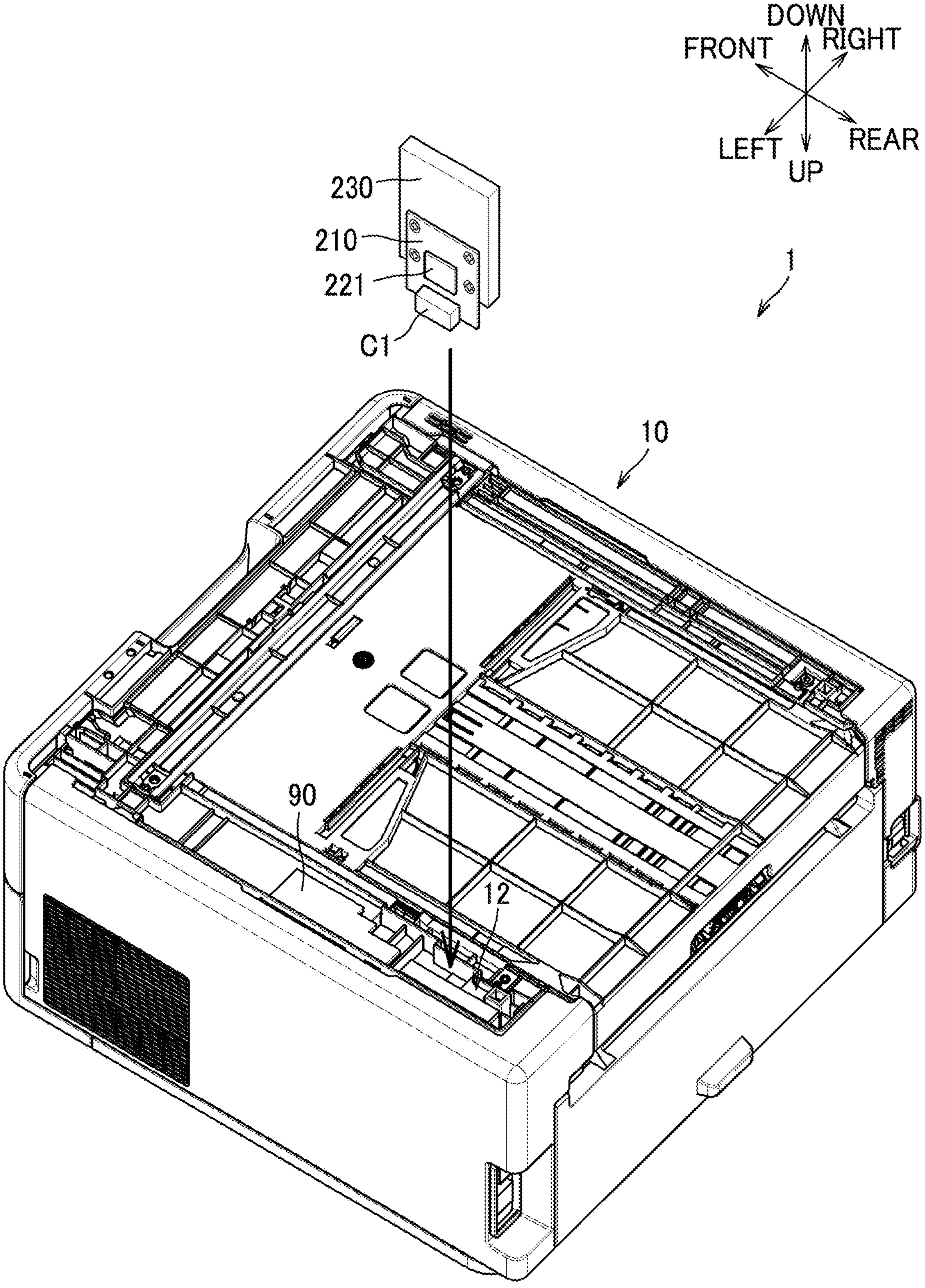
FIG. 13 is a perspective view of an image forming apparatus according to a modified example as viewed from a bottom-surface side of the image forming apparatus.

In the above-described embodiment, the second circuit board 220 comprises the CPU 221 configured to control the image forming unit 40 or the like; however, for example, the first circuit board 210 may comprise the CPU 221, as shown in FIG. 13. If the first circuit board 210 comprises the CPU 221, the CPU 221 can be replaced when the first circuit board 210 is replaced.

The first circuit board and the second circuit board may not be directly connected by the connector, and for example, may be electrically connected via a harness. The image forming apparatus may not comprise a second circuit board.

In the above-described embodiment, the left-side surface 10C is the "one side surface" and the right-side surface 10D is the "other side surface;" however, for example, the right-side surface of the main housing may be the "one side surface" and the left-side surface of the main housing may be the "other side surface." In other words, in the above-described embodiment, the first side cover 110 is positioned on the left side and the second side cover 120 is positioned on the right side; however, for example, the first side cover may be positioned on the right side and the second side cover may be positioned on the left side. In addition, one of the front-side surface or the rear-side surface of the main housing may be the "one side surface" and the other one of the front-side surface or the rear-side surface of the main housing may be the "other side surface."

In the above-described embodiment, the image forming apparatus 1 is a printer that can only form monochrome images; however, for example, the image forming apparatus may be a printer that can form multicolor images. The image forming apparatus may be a photocopier, a multifunction printer, or the like. In the above-described embodiment, an electrographic image forming apparatus is given as an example; however, for example, the image forming apparatus may be an inkjet image forming apparatus, a dot impact image forming apparatus, etc.

Each element explained above in connection with the embodiments and modified examples may be implemented selectively and in combination.

What is claimed is:

1. An image forming apparatus, comprising:
- an image forming unit configured to form an image on a sheet;
- a main housing accommodating the image forming unit and having a bottom surface, a first side surface on one side of the image forming unit, and a second side surface on another side of the image forming unit, the main housing comprising:
  - a first side cover forming the first side surface; and
  - a second side cover forming the second side surface, the second side cover opposed to the first side cover in a first direction;
- a sheet tray positioned below the image forming unit and between the first side cover and the second side cover in the first direction, the sheet tray containing a sheet to be fed to the image forming unit; and
- a first circuit board removably installed in the main housing,
- wherein the main housing includes an opening in the bottom surface between the first side cover and the sheet tray in the first direction, the opening allowing communication between outside of the main housing and inside of the main housing, and allowing the first circuit board to pass therethrough when the first circuit board is being installed into the main housing.

2. The image forming apparatus according to claim 1, further comprising a cover movable with respect to the main housing between an open position in which the opening is uncovered and a closed position in which the opening is covered, wherein
- the main housing is placed on a placement surface when in use and the main housing includes a contact surface on the bottom surface thereof, the contact surface contacting the placement surface, and
- the cover is positioned above the contact surface when the cover is positioned in the closed position.

3. The image forming apparatus according to claim 2, wherein
- the cover is positioned between the first side cover and the sheet tray in the first direction when the cover is positioned in the closed position, and
- the cover is positioned between the first side cover and the sheet tray in the first direction when the cover is positioned in the open position.

4. The image forming apparatus according to claim 3, wherein the cover is slidable with respect to the main housing between the open position and the closed position.

5. The image forming apparatus according to claim 3, wherein the cover is rotatable with respect to the main housing between the open position and the closed position.

6. The image forming apparatus according to claim 1, further comprising a holder configured to hold the first circuit board, the holder installable into and removable from the main housing together with the first circuit board.

7. The image forming apparatus according to claim 6, wherein the holder is configured to cover the opening when the holder is installed in the main housing and to uncover the opening when the holder is removed from the main housing.

8. The image forming apparatus according to claim 7, wherein the main housing includes a contact surface on the bottom surface of the main housing, the contact surface contacting the placement surface, and the holder is positioned above the contact surface when the holder is installed in the main housing.

9. The image forming apparatus according to claim 1, further comprising a second circuit board installed in the main housing, the second circuit board configured to be electrically connected to the first circuit board in a state where the first circuit board is installed in the main housing, wherein the first circuit board comprises a first connector, and the second circuit board comprises a second connector configured to be directly connected to the first connector in a state where the first circuit board is installed in the main housing.

10. The image forming apparatus according to claim 9, wherein the first circuit board comprises a central processing unit (CPU) configured to control the image forming unit.

11. The image forming apparatus according to claim 9, wherein the first circuit board comprises a DC-DC converter, and the second circuit board comprises a CPU configured to control the image forming unit.

12. The image forming apparatus according to claim 9, further comprising a metal plate accommodated in the main housing, the metal plate covering the second circuit board, wherein the metal plate includes an installation guide configured to guide the first circuit board during installation of the first circuit board into the main housing.

13. The image forming apparatus according to claim 1, further comprising a motor configured to provide a driving force to the image forming unit, wherein the main housing includes a first side frame positioned between the first side cover and the sheet tray in the first direction, the first side frame configured to support the motor, the opening is positioned in a bottom surface of the first side frame, and a dimension of the opening in the first direction is smaller than a dimension of the first side frame in the first direction.

14. The image forming apparatus according to claim 13, further comprising:

a pickup roller configured to feed the sheet contained in the sheet tray to the image forming unit; and a driving force transmitting mechanism configured to transmit the driving force of the motor to the pickup roller, wherein the first side frame is configured to support the driving force transmitting mechanism, the motor is positioned between the first circuit board installed in the main housing and the pickup roller as viewed in the first direction, and the driving force transmitting mechanism is positioned between the motor and the pickup roller as viewed in the first direction.

15. The image forming apparatus according to claim 1, wherein the main housing further comprises:

a first side frame positioned between the first side cover and the sheet tray in the first direction; and a second side frame positioned between the second side cover and the sheet tray in the first direction, wherein the opening is positioned in a bottom surface of the first side frame, and a dimension of the first side frame in the first direction is greater than a dimension of the second side frame in the first direction.

16. The image forming apparatus according to claim 1, wherein the first side cover includes an air inlet, the second side cover includes an air outlet, the image forming apparatus comprises a fan configured to generate an air flow flowing from the air inlet toward the air outlet inside the main housing, the fan positioned closer to the second side frame than to the first side frame inside the main housing, the air inlet is positioned on one side of a vertical line running through a central portion of the first side cover in the horizontal direction, as viewed in the first direction, and the first circuit board is positioned on another side of the vertical line as viewed in the first direction when the first circuit board is installed in the main housing.

17. The image forming apparatus according to claim 1, further comprising a display facing upward, wherein the display is positioned below a top surface of the main housing.

18. The image forming apparatus according to claim 1, further comprising:

a display facing upward; and an elastic member protruding upward to a height higher than a height of the display and a height of a top surface of the main housing.

19. The image forming apparatus according to claim 18, wherein the elastic member is a button configured to operate the image forming apparatus.

* * * * *